(12) United States Patent
Shiga

(10) Patent No.: US 8,157,198 B2
(45) Date of Patent: Apr. 17, 2012

(54) TAPE REEL, RECORDING TAPE CARTRIDGE, TAKE-UP REEL, AND DRIVE DEVICE

(75) Inventor: Hideaki Shiga, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 381 days.

(21) Appl. No.: 12/055,912

(22) Filed: Mar. 26, 2008

(65) Prior Publication Data

US 2008/0237382 A1    Oct. 2, 2008

(30) Foreign Application Priority Data

Mar. 27, 2007   (JP) ................. 2007-082737

(51) Int. Cl.
*G11B 15/66* (2006.01)
(52) U.S. Cl. .............. 242/332.4; 242/348; 242/613.1
(58) Field of Classification Search .......... 242/332.4, 242/348, 348.1, 532.5, 532.6, 582, 613, 613.1, 242/613.2; 360/132
See application file for complete search history.

(56) References Cited

U.S. PATENT DOCUMENTS

| | | | | |
|---|---|---|---|---|
| 3,784,166 | A * | 1/1974 | Renfroe | 242/613.1 |
| 4,795,105 | A * | 1/1989 | Frei | 242/613.1 |
| 4,991,784 | A * | 2/1991 | Schmid | 242/390.3 |
| 5,055,951 | A * | 10/1991 | Behr | 360/77.12 |
| 5,979,813 | A * | 11/1999 | Mansbridge et al. | 242/332.4 |
| 6,364,232 | B1 * | 4/2002 | Nemeth et al. | 242/332.4 |
| 7,407,125 | B2 * | 8/2008 | Shiga | 242/332.4 |
| 2003/0098386 | A1 | 5/2003 | Hashimoto | |
| 2004/0021024 | A1 | 2/2004 | Yoshimura et al. | |
| 2005/0103913 | A1 * | 5/2005 | Aaron et al. | 242/332.4 |
| 2007/0252027 | A1 * | 11/2007 | Tsutsui | 242/613 |

FOREIGN PATENT DOCUMENTS

| | | |
|---|---|---|
| JP | 61-054086 | 3/1986 |
| JP | 06-309837 A | 11/1994 |
| JP | 08-315540 | 11/1996 |
| JP | 2002-251859 A | 9/2002 |
| JP | 2003-168278 A | 6/2003 |
| JP | 2004055137 A | 2/2004 |
| JP | 2004-134060 A | 4/2004 |
| JP | 2004164808 A | 6/2004 |
| JP | 2004-310827 A | 11/2004 |
| JP | 2005276387 A | 10/2005 |

OTHER PUBLICATIONS

EP Communication, dated Mar. 27, 2009, issued in corresponding EP Application No. 08005382.0, 8 pages.
JP Office Action Mailed Jul. 27, 2010 issued in JP 2007-082737.

* cited by examiner

*Primary Examiner* — William A Rivera
(74) *Attorney, Agent, or Firm* — Sughrue Mion, PLLC

(57) ABSTRACT

There are provided a tape reel, a recording tape cartridge, a take-up reel, and a drive device at which, when a recording tape is wound on a hub, fluctuations in an axial direction of the hub can be suppressed and occurrence of tape edge damage can be prevented. At a tape reel having a hub on which a recording tape T is wound and flanges which are provided at both end portions of the hub, a large diameter portion, whose diameter is larger than diameters of both end portion sides of the hub, is formed at the hub. The large diameter portion is offset, from a widthwise direction central portion of the hub, toward the one flange side or the other flange side.

20 Claims, 19 Drawing Sheets

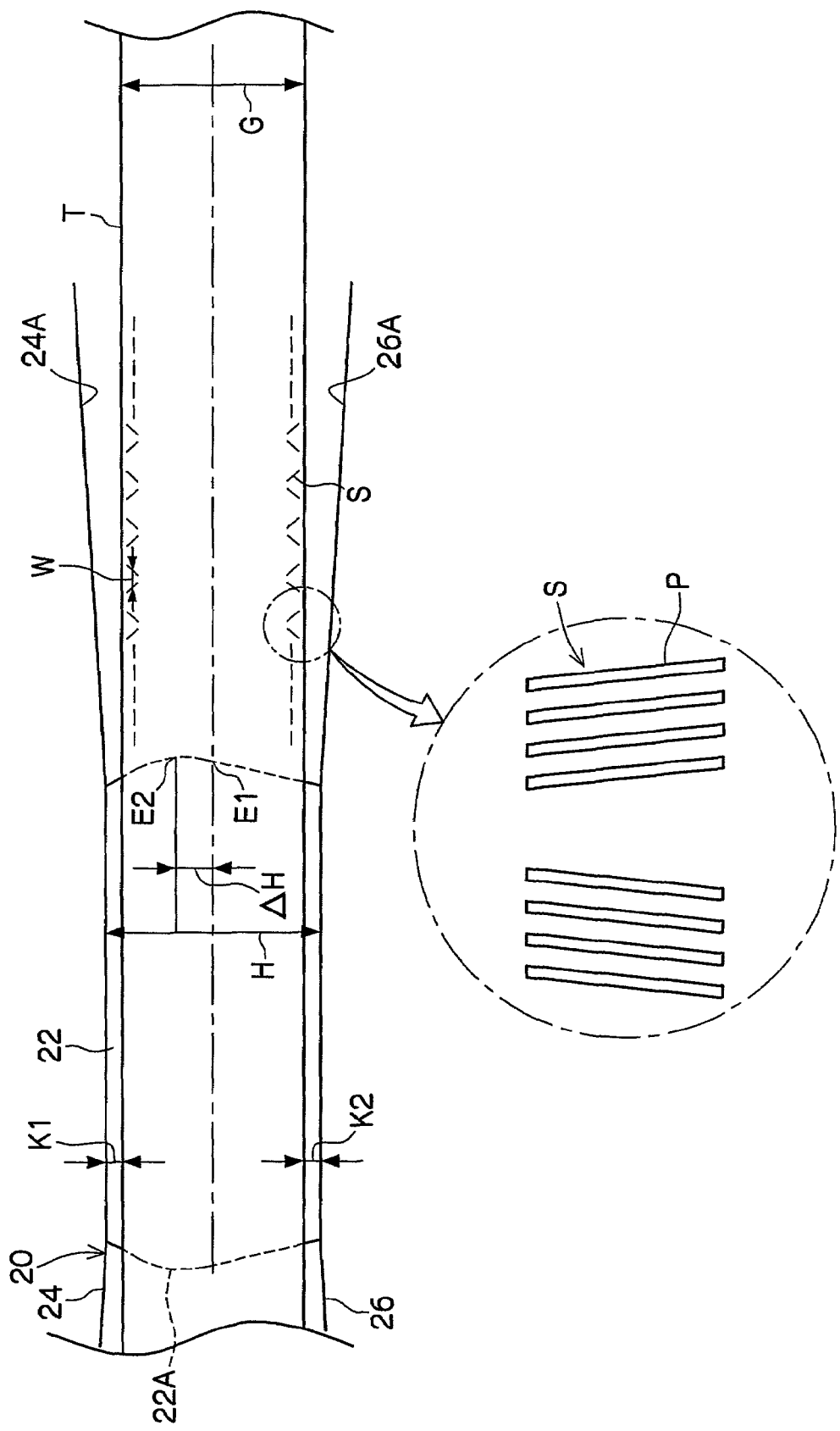

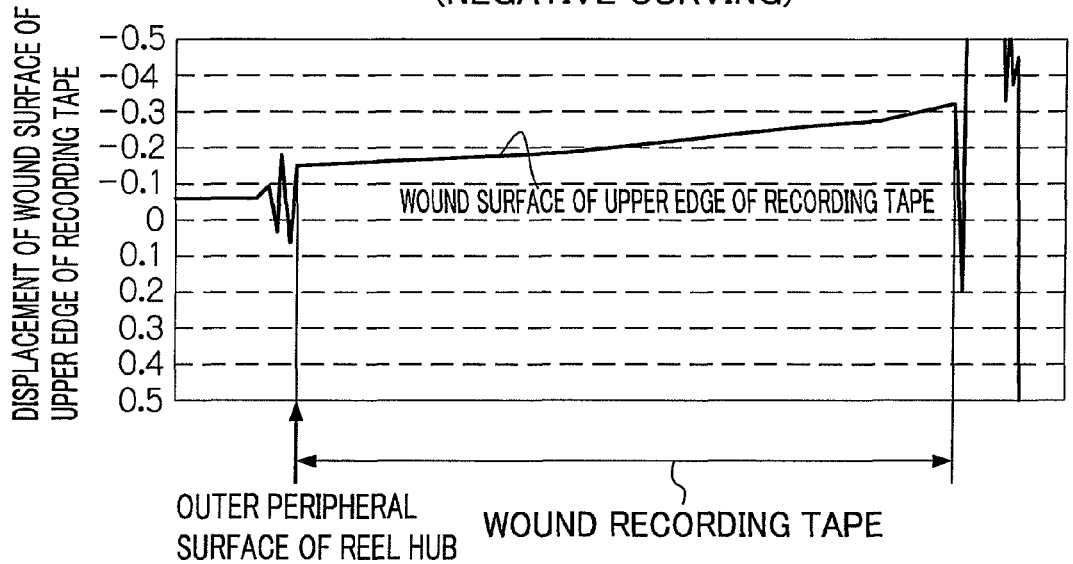
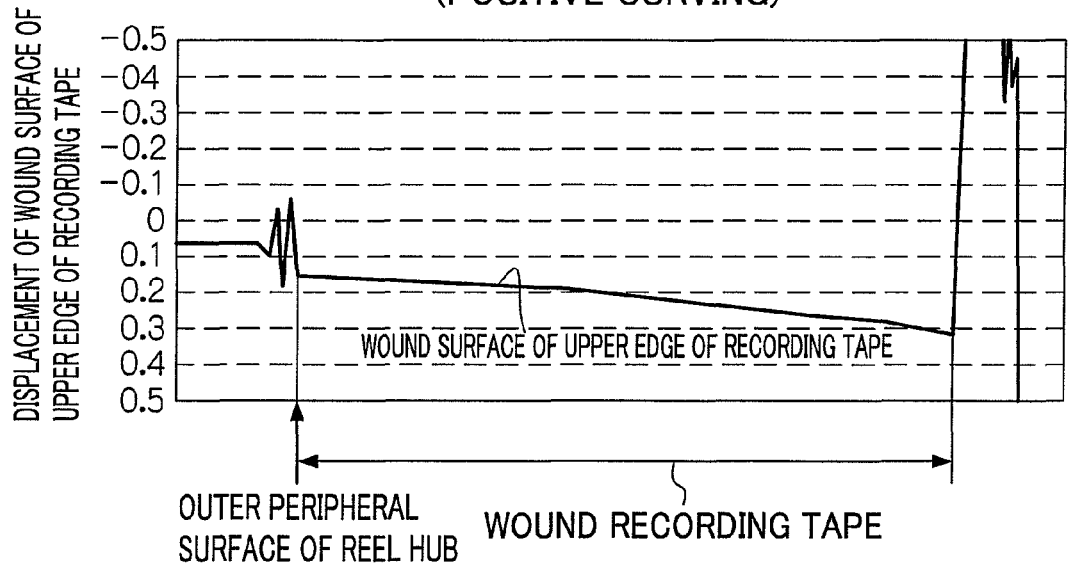

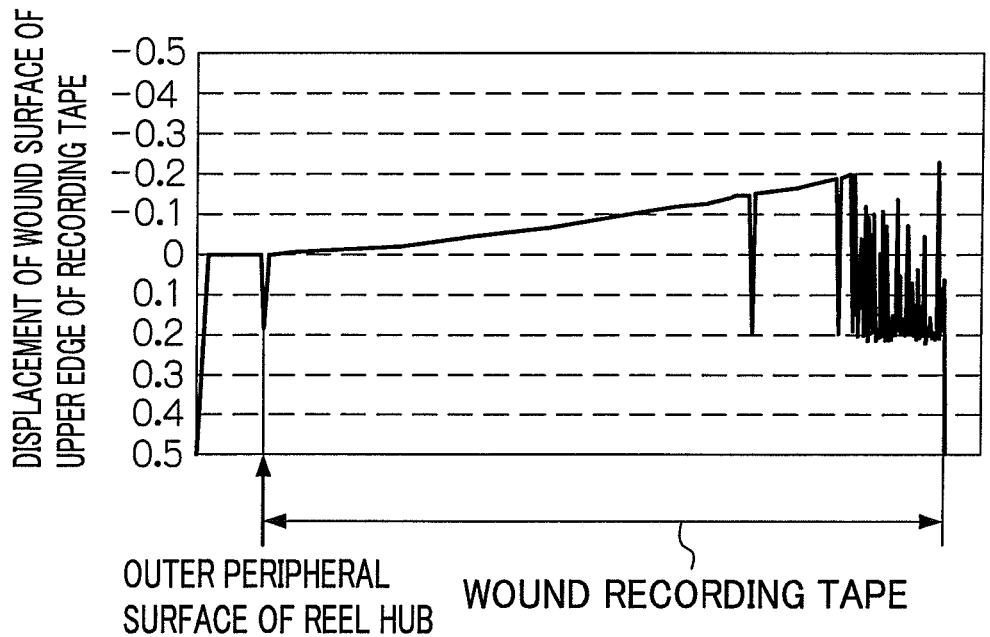
FIG. 11A  △R=45 μm
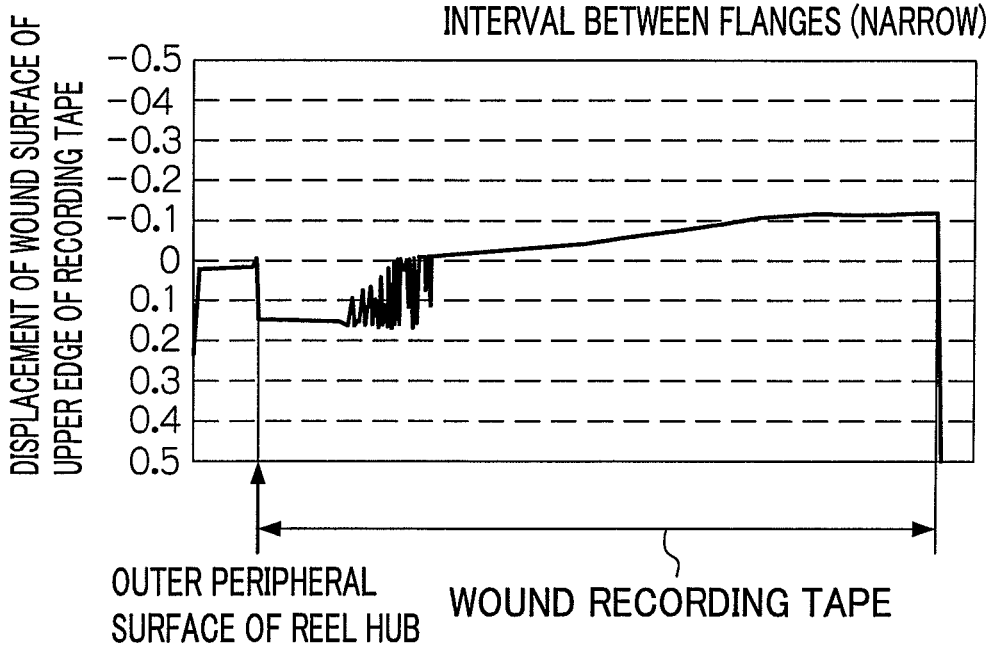
FIG. 11B  △R=45 μm

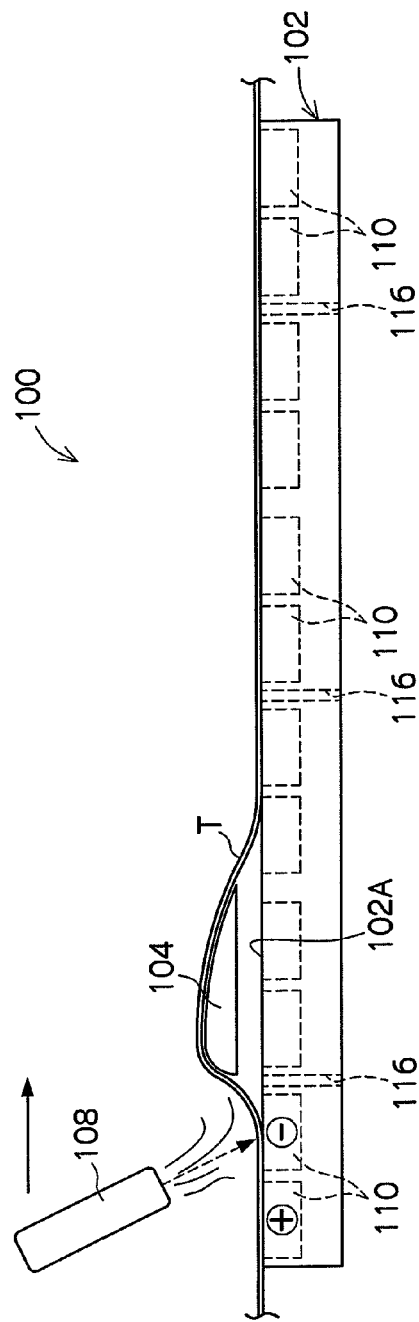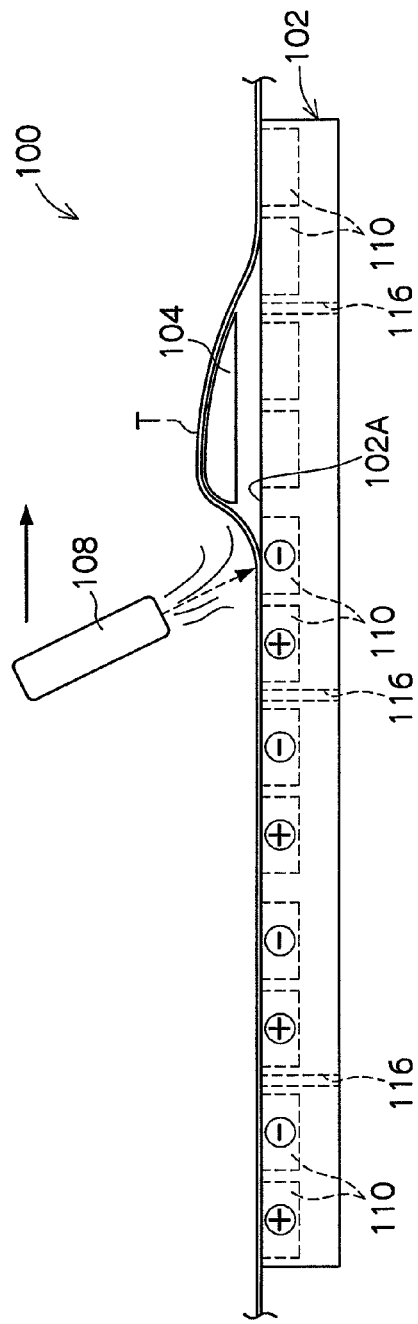

TAPE REEL, RECORDING TAPE CARTRIDGE, TAKE-UP REEL, AND DRIVE DEVICE

CROSS-REFERENCE TO RELATED APPLICATION

This application claims priority under 35 USC 119 from Japanese Patent Application, No. 2007-082737, the disclosure of which is incorporated by reference herein.

BACKGROUND OF THE INVENTION

Technical Field

The present invention relates to a tape reel and a take-up reel on which is wound a recording tape such as a magnetic tape or the like which is used as a recording/playback medium mainly of computers and the like, and to a recording tape cartridge in which the tape reel is accommodated within a case, and to a drive device in which the recording tape cartridge is loaded and which has the take-up reel.

There are conventionally known recording tape cartridges in which a recording tape, such as a magnetic tape or the like which is used as a data recording/playback medium (for data backup) of computers or the like, is wound on the hub (core portion) of a reel (tape reel), and the reel is singly accommodated within a case. When the recording tape cartridge is loaded into a drive device, the recording tape is pulled out via a leader member from an opening provided in the recording tape cartridge. The pulled out recording tape is, via tape guides and a recording/playback head, taken-up onto a take-up reel within the drive device.

In the recording tape cartridge of this configuration, a progress in the recording capacity and a data transfer efficiency of the recording tape is always desired. The main factors supporting the increase in the recording capacity of the recording tape include: (1) improving recording density (improving linear recording density, improving track density); (2) increasing recording area (increasing the tape length by thinning the recording tape); (3) improving servo tracking control; and (4) increasing the traveling speed of the recording tape.

However, there are the following subjects in the aforementioned (1) to (4), and solutions for those subjects are continuously sought after. In particular, ensuring that tape edge damage with respect to an impact when the recording tape cartridge is dropped or the like when the recording tape cartridge is not in use (during transport, during handling) can be reduced and ensuring that tape edge damage during travel of the recording tape when the recording tape cartridge is in use (when the recording tape cartridge has been loaded into a drive device) are sought after.

(1) When recording density improves, the recording size of the data signal also becomes smaller, and the allowable amount of fluctuation in the width direction of the recording tape during travel inside the drive device, and particularly fluctuation at a high frequency (fluctuation in a short amount of time), becomes smaller. That is, when the recording tape fluctuates significantly in its width direction during travel, the recording/playback head that moves in the width direction of the recording tape on the basis of servo signals on the recording tape becomes unable to follow a sudden fluctuation in the position of the recording tape, errors in reading servo signals may occur, and it becomes unable to record and play back the desired data signal.

(2) When the recording tape is thinned, the edge strength of the recording tape drops and it becomes easier for the recording tape to have tape edge damage. That is, when the recording tape cartridge receives an impact during transport or as a result of the recording tape cartridge being dropped or the like, it becomes easier for the edge of the recording tape protruding from the wound surface at the reel to hit flanges and bend. Further, due to thinning of the recording tape, the allowable stress of the recording tape with respect to pressure applied to the recording tape decreases when the recording tape is wound on the reel or when the recording tape is stored over a long period of time.

(3) When the size of the servo signal becomes smaller or the recording density of the servo signal itself improves and servo tracking control improves, the allowable amount of fluctuation in the width direction of the recording tape during travel inside the drive device, and particularly fluctuation at a high frequency (fluctuation in a short amount of time), becomes smaller. That is, when the recording tape fluctuates significantly in its width direction during travel, the recording/playback head that moves in the width direction of the recording tape on the basis of servo signals on the recording tape becomes unable to follow a sudden fluctuation in the position of the recording tape, errors in reading servo signals may occur, and it may becomes unable to record and play back the desired data signal.

(4) When the traveling speed of the recording tape is increased, there is no longer leeway with respect to the response speed of servo tracking control. Further, there is the potential to induce high-frequency vibration. Further, the impact force when the edge of the recording tape contacts flanges of a take-up reel or tape guides of the drive device or flanges of the reel of the recording tape cartridge becomes greater, which becomes disadvantageous to recording tape that has been thinned and whose edge has become weaker.

It is commonly understood that the rigidity of recording tape is affected in cube by a reduction in its thickness. For example, when the thickness of the recording tape is from 8.9 μm to 6.6 μm, it is $6.6^3 \div 8.9^3 = 0.41$ with respect to $6.6 \div 8.9 = 0.74$, and when the thickness is reduced 26%, the rigidity is reduced 59%. There is a tendency for recent recording tape to be thinned in order to increase recording capacity per one recording tape cartridge, and there is concern for a drop in rigidity, that is, a drop in edge strength, and susceptibility to plastic deformation.

Japanese Patent Application Laid-Open (JP-A) No. 2004-134060 for example discloses making a recording tape travel along the inner surface of the upper flange of a hub, by providing a taper angle of 0.01° to 0.1° at the hub and making the side of the hub where the outer diameter is larger (here, the upper side of the hub) be the reference for the traveling of the recording tape. Namely, it is disclosed that, when the hub is taper-shaped, the recording tape is wound toward the side where the outer diameter of the hub is large.

However, the recording tape has curvature (curving in the widthwise direction). This curving of the recording tape affects the wound position of the tape on the hub, and it is often the case that this effect is greater than the effect which is due to the hub being formed in a taper shape. Accordingly, when winding a recording tape onto the hub disclosed in the aforementioned document, there is the possibility that the recording tape may be wound along the inner surface of the lower flange, depending on the orientation of the curving of the recording tape.

Namely, even if the reference for the traveling of the recording tape is made to be the upper flange side, there is the possibility that the recording tape will travel along the lower flange side. Further, in cases in which the curving amount of the recording tape is large, there is the concern that the recording tape will be excessively offset toward one of the flanges and that the tape edge will be damaged by being pushed strongly against that flange. This situation becomes marked in particular when the recording tape is thin. Moreover, if the recording tape is pushed too strongly toward one of the flanges, there is the concern that, due to the reaction caused thereby, the phenomenon will arise in which a single wound section of the recording tape protrudes-out.

Further, JP-A No. 2004-310827 discloses that the wound shape (wound surface of tape edge) of a recording tape is set in good order (the ability of the recording tape to be wound orderly improves) when using a reel in which the hub diameter of one end side of the outer peripheral surface of the hub becomes small with respect to the hub diameter of the other end side as the recording tape is wound on the hub. In this case, as the amount of the recording tape which is wound onto the hub increases, the taper amount of the hub increases. However, usually, there is dispersion in the orientations of the curving of recording tapes and in the amounts of curving thereof. Therefore, the position at which the recording tape travels with respect to the hub fluctuates, and the wound shape (wound surface of the tape edge) of the recording tape on the hub fluctuates. Therefore, with such a reel, there is the concern that, conversely, the ability of the recording tape to be wound orderly will deteriorate or that tape edge damage will be promoted.

Further, as described in JP-A No. 6-309837, for example, causing the width direction central portion of the hub to swell (in a convex shape) into a substantially crowning shape in a reel or the like on which recording tape is wound has conventionally been disclosed. However, when the recording tape is thinned, with the large swelling amount of the crowning shape disclosed in JP-A No. 6-309837, deformation in an undulating shape and cinching occur in the tape edge (though this is not expressly stated in JP-A No. 6-309937). According to an experiment by the present applicant, the swelling amount of the crowning shape was around 0.08 mm at most when recording tape having a thickness of 6.6 μm, for example, was wound on a hub having a wall thickness of 2.5 μm and made of 10% glass fiber-reinforced PC resin. That is, when the swelling amount becomes larger than around 0.08 mm, deformation in an undulating shape and cinching would occur.

SUMMARY

In view of the aforementioned, the present invention provides a tape reel, a recording tape cartridge, a take-up reel, and a drive device in which, when a recording tape is wound onto a hub, fluctuations of the recording tape in the axial direction of the hub can be suppressed and the occurrence of tape edge damage can be prevented.

A tape reel of a first aspect of the present invention has a hub on which a recording tape is wound, and flanges provided at both end portions of the hub. The hub has a large diameter portion whose diameter is larger than diameters of both widthwise direction (axial direction) end portion sides. The large diameter portion is offset, from a widthwise direction central portion of the hub, toward one flange side or another flange side.

BRIEF DESCRIPTION OF THE DRAWINGS

Embodiments of the present invention will be described in detail based on the following figures, wherein:

FIG. 6 is a schematic side view showing servo signals of a recording tape;

FIG. 9A is a wound posture measurement chart of a recording tape having negative direction curving;

FIG. 9B is a wound posture measurement chart of a recording tape having positive direction curving;

FIG. 11A is a wound posture measurement chart of a recording tape having negative direction curving in a case in which $\Delta R=45$ μm and the flange interval is a conventional interval;

FIG. 11B is a wound posture measurement chart of a recording tape having negative direction curving in a case in which $\Delta R=45$ μm and the flange interval is narrower than a conventional interval;

FIG. 16A is a schematic side view explaining operation of the tape shape measuring device;

FIG. 16B is a schematic side view explaining operation of the tape shape measuring device;

DETAILED DESCRIPTION OF THE INVENTION

Figure 4:
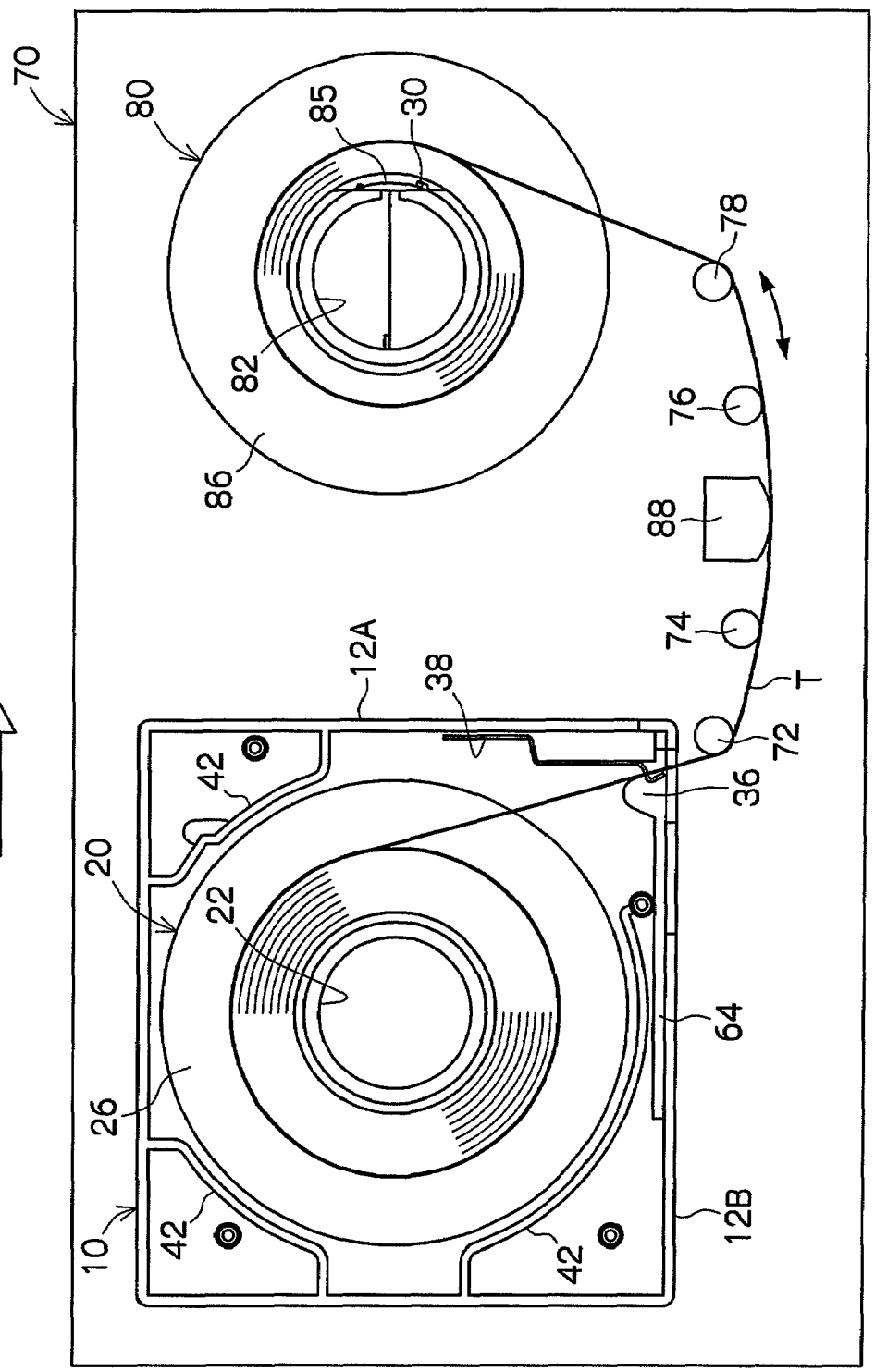
FIG. 4 is a schematic plan view of a drive device after the recording tape cartridge has been loaded therein.
Figure 5:
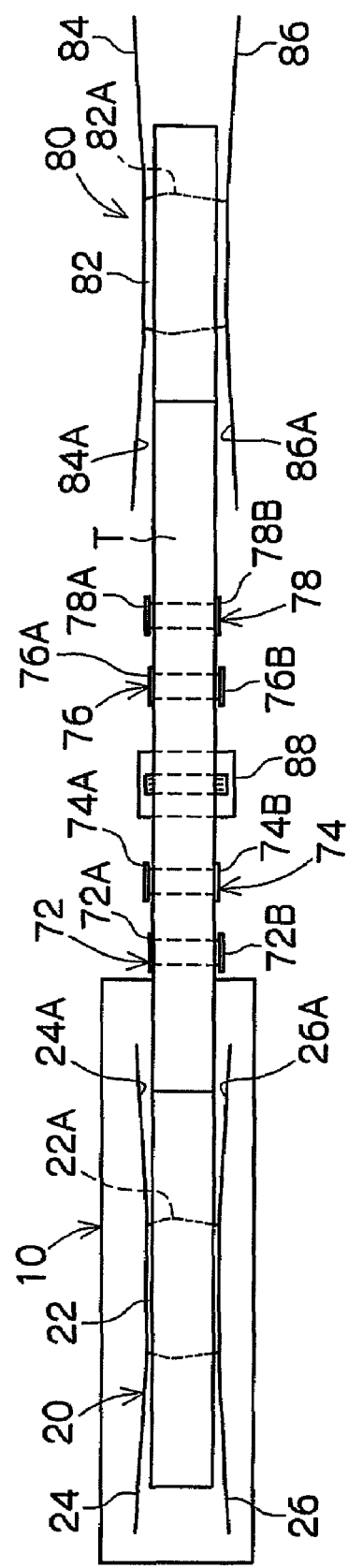
FIG. 5 is a schematic side view of the drive device after the recording tape cartridge has been loaded therein.

Herebelow, an example of an exemplary embodiment of the present invention will be described in detail with reference to the drawings. Note that, for convenience of explanation, in FIG. 1, the direction of loading a recording tape cartridge 10 into a drive device 70 (see FIG. 4) is denoted by arrow A, and this direction of arrow A is the forward direction (front side) of the recording tape cartridge 10. The direction of arrow B, which is orthogonal to arrow A, is the rightward direction (right side). Further, the direction of arrow C is the width direction in the present exemplary embodiment, and is the same direction as the vertical direction and the heightwise direction, as well as the axial direction of a reel 20 (a reel hub 22) and a take-up reel 80 (a reel hub 82).

Figure 1:
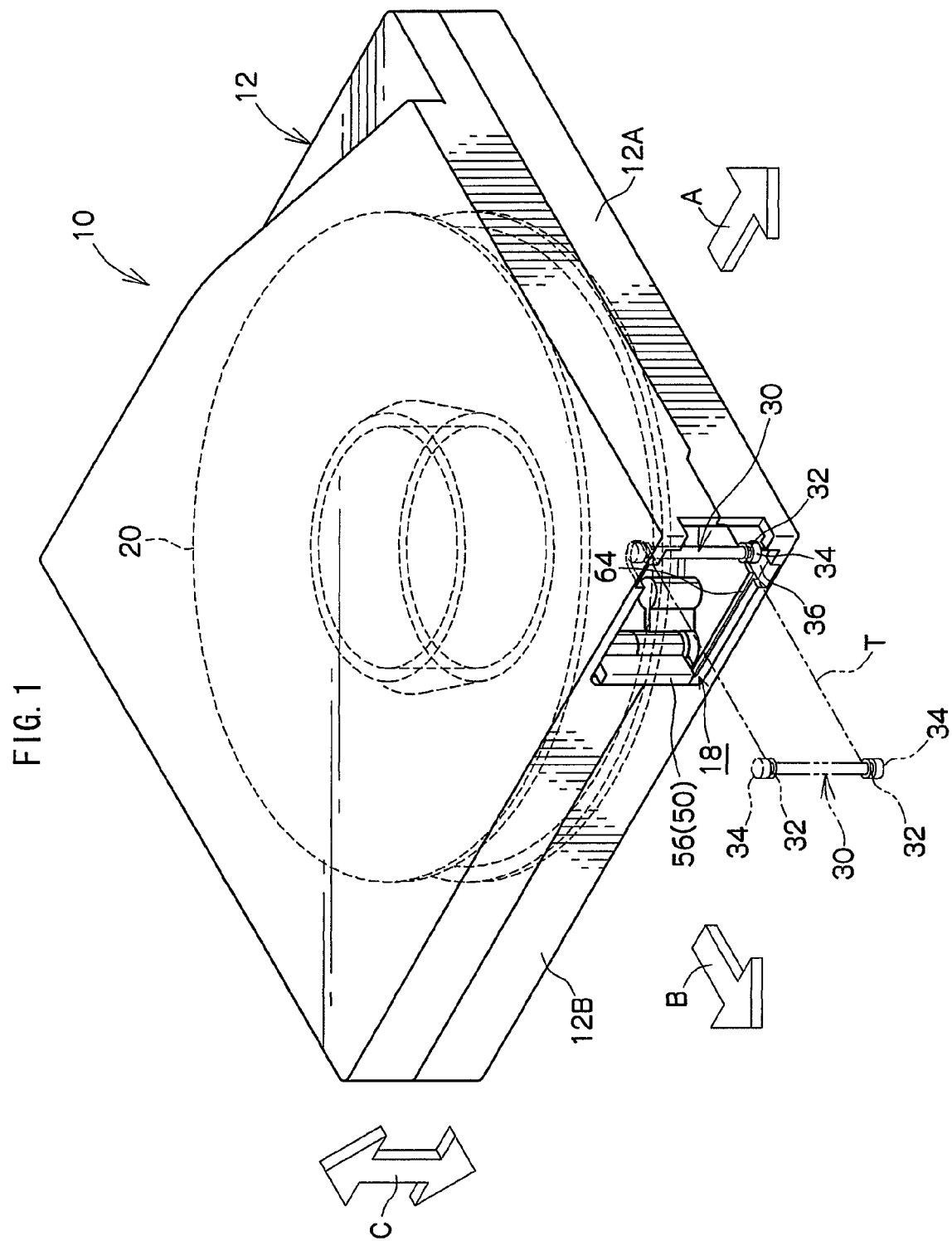
FIG. 1 is a schematic perspective view of a recording tape cartridge relating to a present exemplary embodiment.
Figure 2:
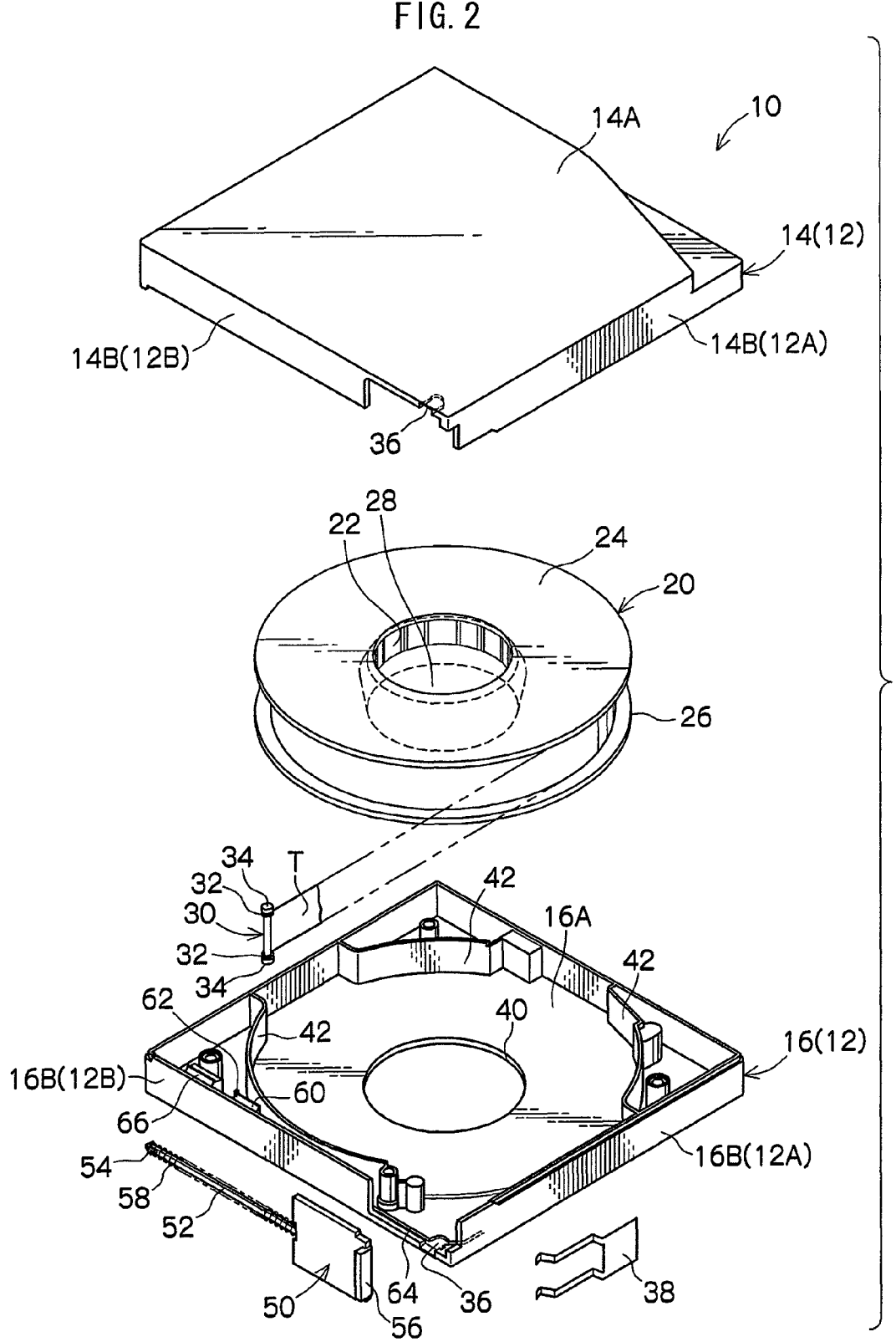
FIG. 2 is a schematic exploded perspective view of the recording tape cartridge relating to the present exemplary embodiment.

As shown in FIG. 1 and FIG. 2, the recording tape cartridge 10 has a case 12 which is substantially shaped as a rectangular box. The case 12 is structured by an upper case 14 and a lower case 16, which are made of a resin such as polycarbonate (PC) or the like, being joined together by ultrasonic welding, screws or the like in a state in which a peripheral wall 14B, which stands erect at the peripheral edge of a ceiling plate 14A, and a peripheral wall 16B, which stands erect at the peripheral edge of a floor plate 16A, are abutting one another.

Only one of the reel (tape reel) 20 is rotatably accommodated within the case 12. The reel 20 has the reel hub 22 which is formed in a substantially cylindrical shape having a floor and which structures the axially central portion (core portion) of the reel 20, an upper flange 24 provided at the upper end portion of the reel hub 22, and a lower flange 26 provided at the lower end portion of the reel hub 22. The lower flange 26 and the reel hub 22 are molded integrally. Further, the upper flange 24 which is annular is ultrasonically welded to and structured integrally with the upper end portion of the reel hub 22.

That is, the reel 20 has a configuration where the reel hub 22 and the upper and lower flanges 24 and 26 are integrally structured and where the upper and lower flanges 24 and 26 also deform in accompaniment with deformation of the reel hub 22 resulting from the tight-winding of the recording tape T (the opposite is also possible; in other words, deformation of the reel hub 22 and deformation of the upper and lower flanges 24 and 26 are linked to/affect each other).

Figure 13A:
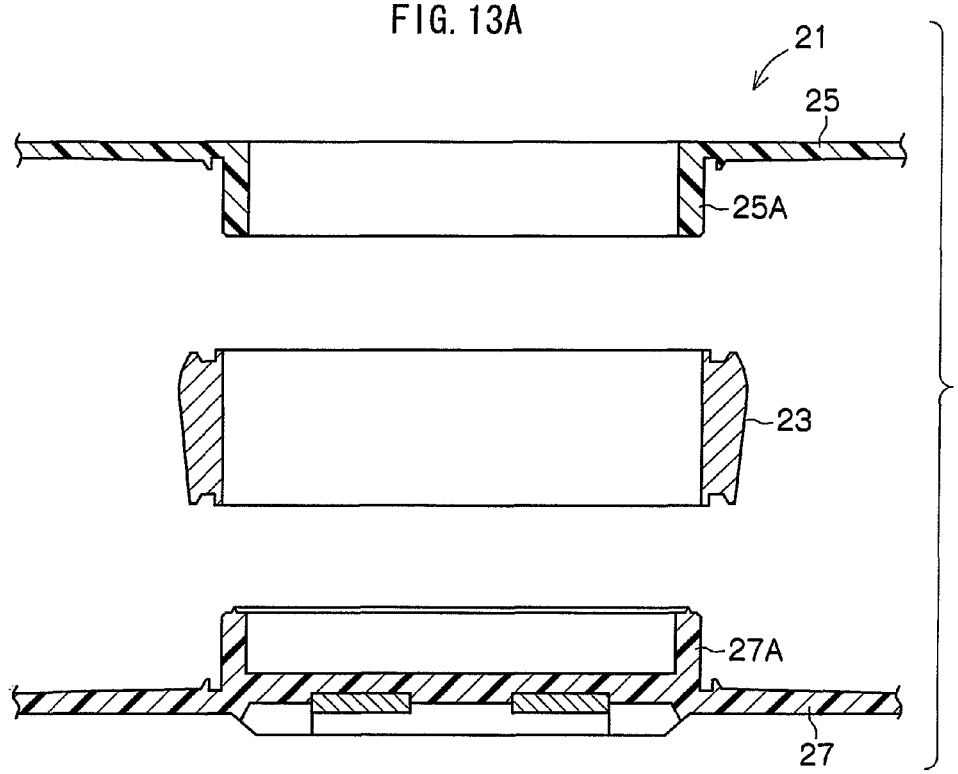
FIG. 13A is a schematic, exploded side sectional view showing an example of a reel which is structured differently than the present exemplary embodiment.
Figure 13B:
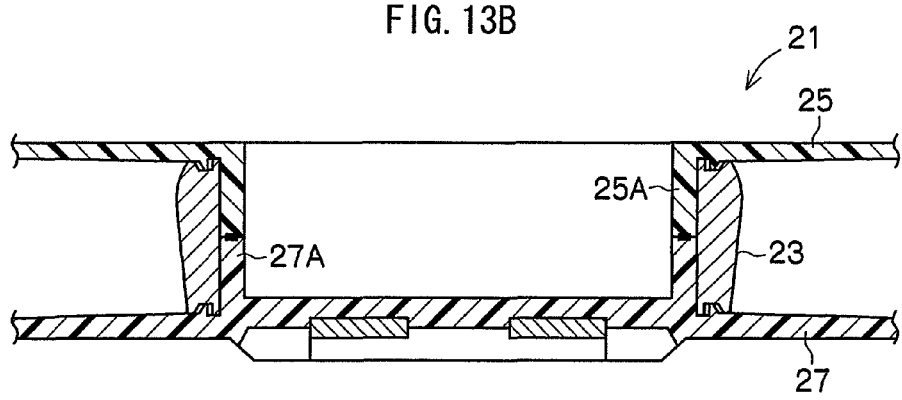
FIG. 13B is a schematic side sectional view showing the example of the reel which is structured differently than the present exemplary embodiment.

Incidentally, a reel of a configuration that is not integrated is a reel 21 such as shown in FIGS. 13A and 13B. The reel 21 has a configuration where a cylinder portion 25A of an upper flange 25 and a cylinder portion 27A of a lower flange 27 are welded to each other, a reel hub 23 is fitted at the outer sides of the cylinder portions 25A and 27A, and the reel hub 23 and the upper and lower flanges 25 and 27 are mutually independent (or close to that independent state). For that reason, in the reel 21, deformation of the reel hub 23 and deformation of the upper and lower flanges 25 and 27 are not linked to/do not affect each other (or are difficult to be linked to/affect each other), or in other words, the upper and lower flanges 25 and 27 are not linked to/do not affect each other (or are difficult to be linked to/affect each other), or in other words, the upper and lower flanges 25 and 27 do not deform (or are difficult to deform) even when the reel hub 23 deforms.

The recording tape T, which is a magnetic tape or the like and serves as an information recording/playback medium, is wound on the outer peripheral surface of the reel hub 22 at a predetermined tight-winding force F (e.g., F=0.588 N to 0.980 N). The width of the fluctuation in the width direction of the wound recording tape T is restricted by the upper flange 24 and the lower flange 26. Note that the mutually-opposing surfaces of the upper flange 24 and the lower flange 26 are taper surfaces 24A, 26A (see FIG. 3) at which the interval between the flanges gradually increases toward the outer side (the outer peripheral edge side).

Note that, in order to increase the recording capacity, the thickness of the recording tape T is made to be less than or equal to 7.5 μm, and preferably less than or equal to 6.9 μm. Moreover, a total clearance K (K=k1+k2) of upper and lower clearances k1 and k2 determined by subtracting a width (in this case, ½ inch, 12.65 mm) G of the recording tape T prescribed by the drive device 70 side from a distance (innermost flange interval) H between the upper and lower flanges 24 and 26 at the outer peripheral surface of the reel hub 22 is set such that K=0.10 mm to 0.18 mm (see FIG. 6).

For the clearance K, in actuality, either the recording tape T is adhered to the surface of the reel hub 22, and the edge of the recording tape T is offset toward either one of the upper and lower flanges (e.g., the upper flange 24), and the gap between the other edge of the recording tape T and the other flange (e.g., the lower flange 26) is measured, or, the width of the recording tape T and the distance between the flanges at the reel hub 22 are measured, and the value obtained by subtracting the former from the latter is determined. However, the latter method is more practical.

Figure 3:
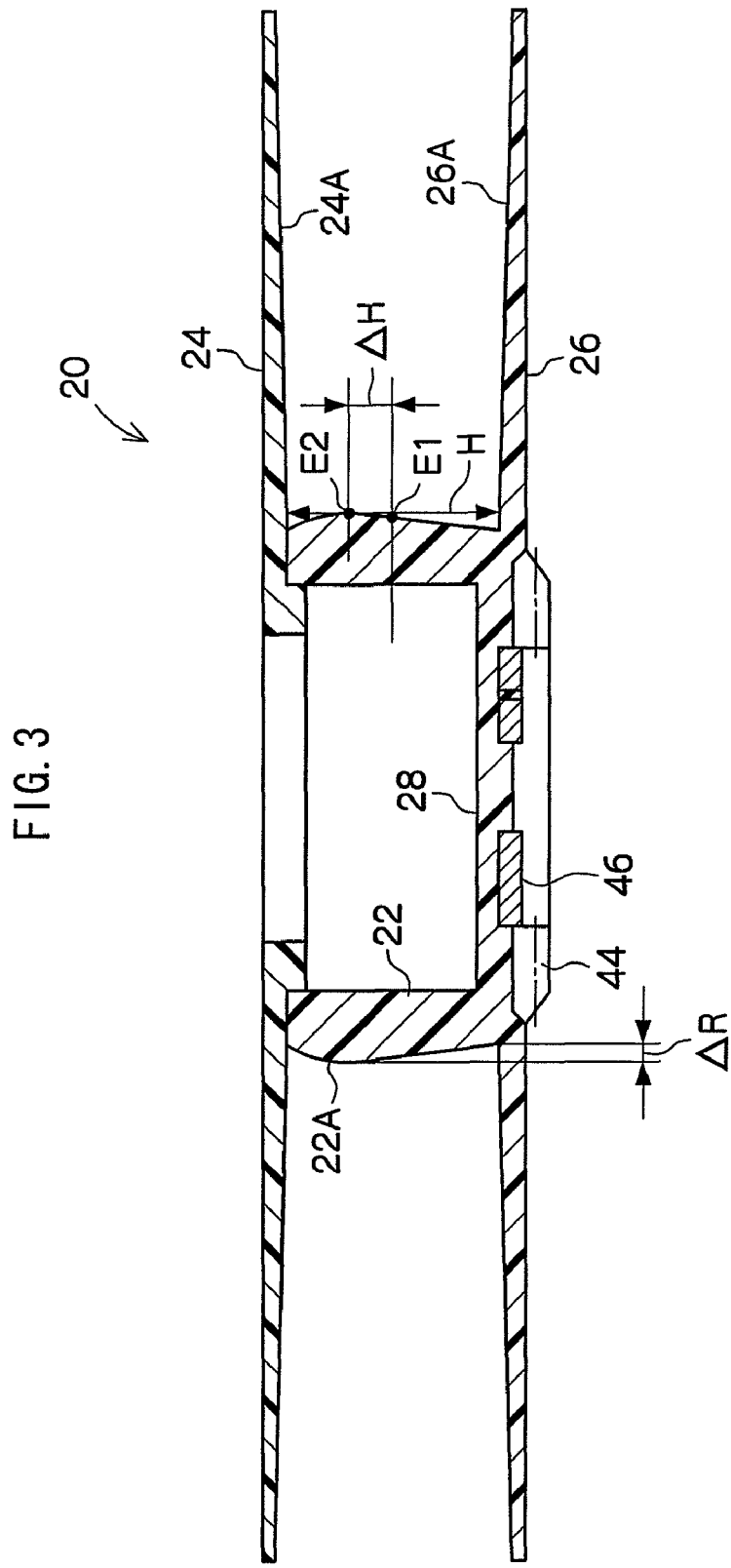
FIG. 3 is a schematic side sectional view of a reel relating to the present exemplary embodiment.

Further, as shown in detail in FIG. 3, the configuration of the reel hub 22 as seen in side view is substantially shaped as a crown at which the upper side portion, which is above a widthwise direction (axial direction) central portion E1, swells in a circular arc shape (but is not limited to a circular arc shape). Namely, the reel hub 22 has a large diameter portion 22A which has a larger outer diameter than the outer diameters of the both upper and lower end portion sides of the reel hub 22. This large diameter portion 22A is offset by a predetermined amount (offset amount ΔH) toward the upper flange 24 side from the widthwise direction central portion E1 of the reel hub 22.

The offset amount ΔH of the large diameter portion 22A, which is from the widthwise direction central portion E1 of the reel hub 22 to a widthwise direction central portion E2 of the large diameter portion 22A, is preferably 5% to 40% of a width H at the outer peripheral surface of the reel hub 22 (H is the line tangent to the large diameter portion 22A). If the offset amount ΔH is less than 5% of the width H, the recording tape T cannot be offset well toward one end portion side. If the offset amount ΔH is greater than 40% of the width H, the recording tape T will be excessively offset toward one end portion side.

It is more preferable that the offset amount ΔH be 8% to 24% of the width H. In this range, good effects can be obtained even if the curving of the recording tape is large to a certain extent. Namely, it was confirmed empirically that, at a reel at which the widthwise direction central portion E2 of the large diameter portion 22A is offset by about 1 mm (corresponding to about 8%) from the widthwise direction central portion E1 of the reel hub 22, the maximum step/protrusion amount of the recording tape and the wound posture thereof which will be described later are better than at a reel in which the widthwise direction central portion E2 of the large diameter portion 22A is in a vicinity of the widthwise direction central portion E1 of the reel hub 22. Further, it was also empirically confirmed that similar effects are obtained also at a reel at which there is offset of at least 3 mm (corresponding to about 24%).

The outer diameters of the upper and lower both end portions of the reel hub 22 do not necessarily have to be the same at the upper flange 24 side and the lower flange 26 side, and it suffices for them to be smaller than the outer diameter of the large diameter portion 22A. However, it is preferable that the outer diameter of the end portion of the reel hub 22 at the one side toward which the large diameter portion 22A is offset be smaller than the outer diameter of the end portion of the reel hub 22 at the other side.

Figure 8A:
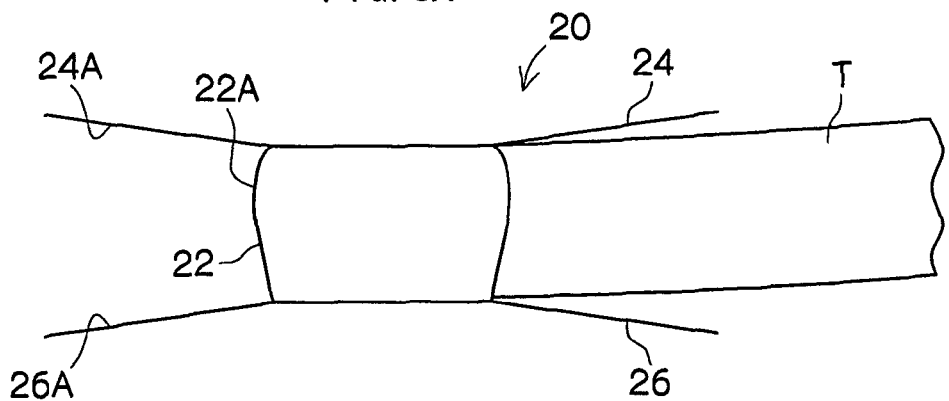
FIG. 8A is a schematic side view showing a state in which the recording tape is wound on the reel.
Figure 8B:
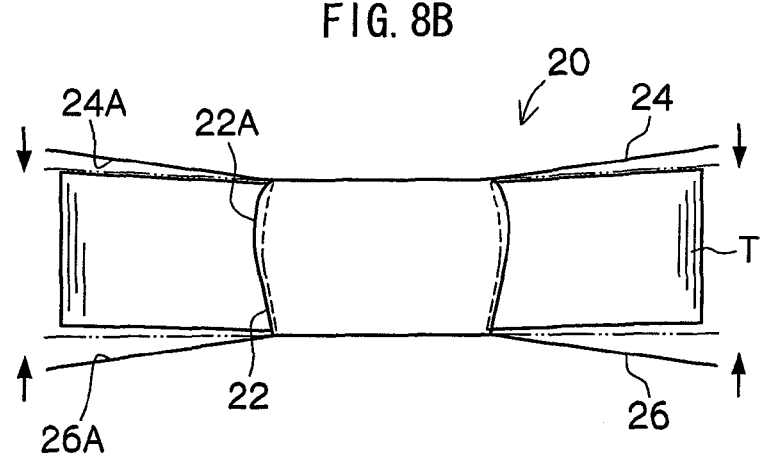
FIG. 8B is a schematic side view explaining operation of the reel.
Figure 8C:
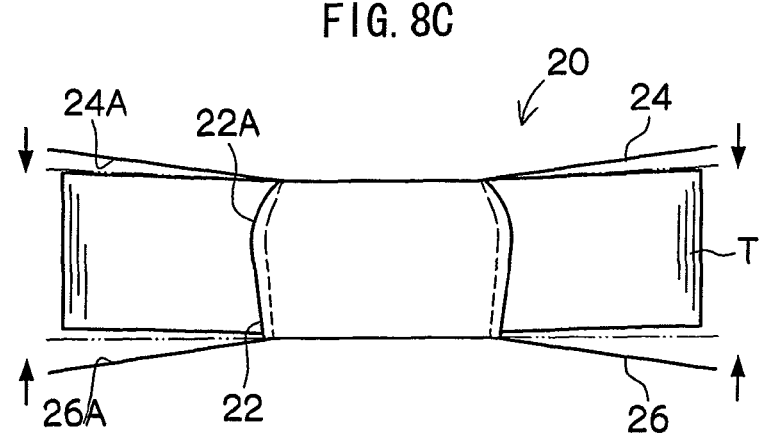
FIG. 8C is a schematic side view explaining operation of the reel.

Namely, as shown in FIG. 8C, it is preferable that the outer diameter of the end portion of the reel hub 22 at the upper flange 24 side is smaller than the outer diameter of the end portion of the reel hub 22 at the lower flange 26 side. Further, higher rigidities of the reel hub 22 are preferable, and the flexural modulus thereof is greater than or equal to 16.0 GPa, and preferably greater than or equal to 19.2 GPa.

A convex amount $\Delta R$, which is the difference between the radius of the large diameter portion 22A of the reel hub 22 and the greater radius among those of the upper and lower both end portions, or the radius of the lower flange 26 side end portion in this case, is $\Delta R \leq 0.08$ mm, and preferably, $\Delta R \leq 0.067$ mm. Further, a ratio J ($J = \Delta R/G$) of the convex amount $\Delta R$ with respect to a width G of the recording tape T (12.65 mm in this case) which is prescribed at the drive device 70 side, is $J \leq 0.0063$, and preferably, $J \leq 0.0053$.

Figure 14:
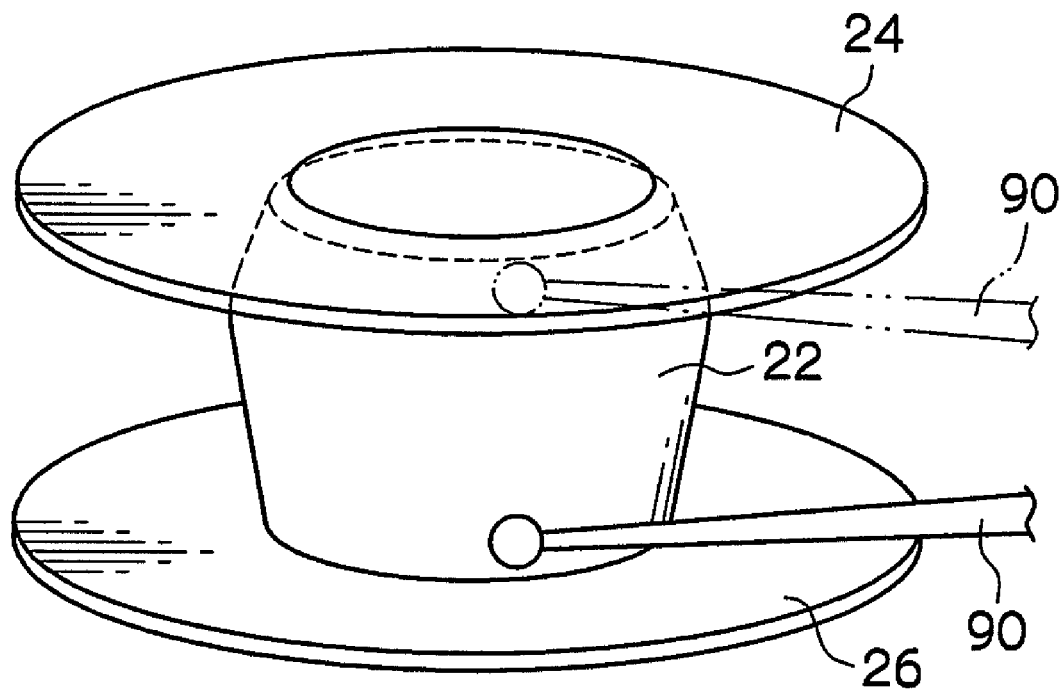
FIG. 14 is a schematic perspective view for explaining a method of measuring the radius of the reel.

A method of measuring the aforementioned convex amount $\Delta R$ will be described next. As shown in FIG. 14, the reel 20 is set on an unillustrated master chucking gear (a highly-accurate reference gear) such that a chucking portion (a reel gear 44 which will be described later) of the reel 20 which is chucked by the drive device 70 is directed downward. Then, in this state, the outer shape of the reel hub 22 is measured from the lower end portion side to the upper end portion side by a touch sensor probe 90 of a contact-type three-dimensional measuring device.

At this time, the provisional center (axial center) at the time of measuring the radius of the reel hub 22 is the center (axial center) of the master chucking gear. Further, because the touch sensor probe 90 which has a diameter of 1 mm is used, the positions of upper end portion and the lower end portion of the measurement positions are set such that the central positions thereof at the time of measurement are within ranges of 0.7 mm to 1.0 mm from the upper end portion and the lower end portion of the reel hub 22 respectively, so that the touch sensor probe 90 does not interfere with the upper flange 24 or the lower flange 26. The measurement points are set at substantially uniform intervals such that the total number thereof is at least 10. This measurement is carried out in the same way at six places which are at 60° intervals.

From these results, the convex amount $\Delta R = (\Delta Rmax + \Delta Rmin)/2$ of the reel hub 22 is computed. Note that $\Delta Rmax$ is the maximum value of $\Delta R1$ through $\Delta R6$, and $\Delta Rmin$ is the minimum value of $\Delta R1$ through $\Delta R6$. Further, $\Delta R1$ through $\Delta R6$ are Rnmax−(the greater of the radius values among the radius values of the upper end portion and the lower end portion) (n=1 to 6), at each of the positions of the six places which are at the 60° intervals. Moreover, R1max through R6max are the maximum values among the measured values of the radius at the positions of the six places at the 60° intervals, which are measured by the above-described method.

As shown in FIG. 3, a reel gear 44 is formed in an annular shape at the bottom surface of a floor wall 28 of the reel hub 22. A gear opening 40, which is for exposing the reel gear 44 to the exterior, is formed in the central portion of the lower case 16 (see FIG. 2). The reel gear 44, which is exposed from this gear opening 40, meshes-together with a driving gear (not shown) of the drive device 70 (see FIG. 4), and is driven and rotated thereby. In this way, the reel 20 is able to rotate relative to the case 12 within the case 12.

A reel plate 46, which is formed in an annular shape of a magnetic material, is fixed by insert molding or the like to the lower surface of the floor wall 28 at the radial direction inner side of the reel gear 44. The reel plate 46 is attracted and held by the magnetic force of an annular magnet (not shown) of the drive device 70. Further, the reel 20 is held so as to not joggle by play restricting walls 42 which serve as inner walls which project-out locally at the inner surfaces of the upper case 14 and the lower case 16 and are on circular loci which are coaxial with the gear opening 40 (see FIG. 2).

Further, as shown in FIG. 1 and FIG. 2, an opening 18 for the pulling-out of the recording tape T wound on the reel 20 is formed in a right wall 12B of the case 12. A leader pin 30, which is pulled out and operated while being anchored (engaged) by a leader block 85 (see FIG. 7A and FIG. 7B) which serves as a pullout member of the drive device 70, is fixed to the free end portion of the recording tape T which is pulled out from the opening 18. Annular grooves 32 are formed in the both end portions of the leader pin 30 which project-out further than the width direction end portions of the recording tape T. These annular grooves 32 are anchored by hooks 85A or the like of the leader block 85 (see FIG. 7A and FIG. 7B).

Further, a pair of upper and lower pin holding portions 36 are provided at the inner side of the opening 18 of the case 12, i.e., at the inner surface of the ceiling plate 14A of the upper case 14 and the inner surface of the floor plate 16A of the lower case 16. The pin holding portions 36 position and hold the leader pin 30 within the case 12. The pin holding portions 36 are formed in substantially semicircular shapes whose recording tape T pull-out sides are open. Both end portions 34 of the leader pin 30, which is in an upright state, can enter into and exit from the pin holding portions 36 from these open sides.

A leaf spring 38 is disposed and fixed in a vicinity of the pin holding portions 36. The distal end portions of a bifurcated portion of the leaf spring 38 respectively engage with the upper and lower end portions 34 of the leader pin 30, such that the leader pin 30 is held in the pin holding portions 36. Note that, when the leader pin 30 is to enter into or exit from the pin holding portions 36, the distal end portions of the leaf spring 38 are appropriately elastically deformed so as to permit movement of the leader pin 30.

The opening 18 is opened and closed by a door 50. The door 50 is structured as a substantially rectangular plate of a size which can close the opening 18. Groove portions 64, into which the upper and lower end portions of the door 50 are slidably fit, are formed in the ceiling plate 14A and the floor plate 16A at the inner side of the opening 18, such that the door 50 can move along the right wall 12B of the case 12.

A shaft 52 is formed to project at the center of the rear end portion of the door 50. A coil spring 58 is fit around the shaft 52. A widened portion 54, which prevents the coil spring 58 from falling-off, is formed at the rear end of the shaft 52. A supporting stand 60, which has an anchor portion 62 which anchors the rear end of the coil spring 58 which is fit around the shaft 52, projects from the lower case 16.

Accordingly, due to the shaft 52 being supported so as to be freely slidable on the supporting stand 60 and the rear end of the coil spring 58 being anchored on the anchor portion 62, the door 50 is always urged in the direction of closing the opening 18 by the urging force of the coil spring 58. Note that it is preferable that a supporting stand 66, which supports the shaft 52 when the opening 18 is open, be formed so as to project-out at the rear side of the supporting stand 60.

A convex portion 56 for opening/closing operation projects outwardly from the front end portion of the door 50. The convex portion 56 engages with an opening/closing member (not shown) of the drive device 70 as the recording tape cartridge 10 is loaded into the drive device 70. The door 50 is thereby opened against the urging force of the coil spring 58.

An example of the drive device 70 into which the recording tape cartridge 10 is loaded will be described next. As shown in FIG. 4 through FIG. 7B, the drive device 70 has the take-up reel 80 on which the recording tape T, which has been pulled out from the recording tape cartridge 10 via the leader pin 30, is wound.

The take-up reel 80 has substantially the same structure as the reel 20. Namely, the take-up reel 80 has a reel hub 82 which is formed in a substantially cylindrical shape having a floor and which structures the axially central portion (core portion) of the take-up reel 80, an upper flange 84 provided at the upper end portion of the reel hub 82, and a lower flange 86 provided at the lower end portion of the reel hub 82. The lower flange 86 and the reel hub 82 are molded integrally.

The upper flange 84 is structured integrally with the upper end portion of the reel hub 82 by being screwed (fixed) thereto via a metal retainer plate (not shown). Accordingly, at the take-up reel 80, the upper and lower flanges 84 and 86 also deform in accompaniment with deformation of the reel hub 82 resulting from the tight-winding of the recording tape T (deformation of the reel hub 82 and deformation of the upper and lower flanges 84 and 86 are linked to/affect each other).

The recording tape T can be wound on the outer peripheral surface of the reel hub 82, and the fluctuation amount in the width direction of the wound recording tape T is restricted by the upper flange 84 and the lower flange 86. Note that the mutually-opposing surfaces of the upper flange 84 and the lower flange 86 are taper surfaces 84A, 86A (see FIG. 5) at which the interval between the flanges gradually increases toward the outer side (the outer peripheral edge side).

Moreover, a total clearance K (K=k1+k2) of upper and lower clearances k1 and k2 determined by subtracting a width (12.65 mm) G of the recording tape T from a distance (innermost flange interval) H between the upper and lower flanges 84 and 86 at the outer peripheral surface of the reel hub 22 is set such that K=0.10 mm to 0.18 mm (see FIG. 6). These points as well are the same as in the case of the reel 20.

In the same way as the reel hub 22, the configuration of the reel hub 82 as seen in side view is substantially shaped as a crown at which the upper side portion, which is above the widthwise direction (axial direction) central portion E1, swells in a circular arc shape. Namely, the reel hub 82 has a large diameter portion 82A which has a larger outer diameter than the outer diameters of the both upper and lower end portion sides of the reel hub 82. This large diameter portion 82A is offset by a predetermined amount (offset amount ΔH) toward the upper flange 84 side from the widthwise direction central portion E1 of the reel hub 82.

Note that the offset amount ΔH of the large diameter portion 82A, which is from the widthwise direction central portion E1 of the reel hub 82 to the widthwise direction central portion E2 of the large diameter portion 82A, is preferably 5% to 40% of the width H at the outer peripheral surface of the reel hub 82 (H is the line tangent to the large diameter portion 82A), and is more preferably 8% to 24%. This is similar to the case of the reel hub 22.

Figure 7A:
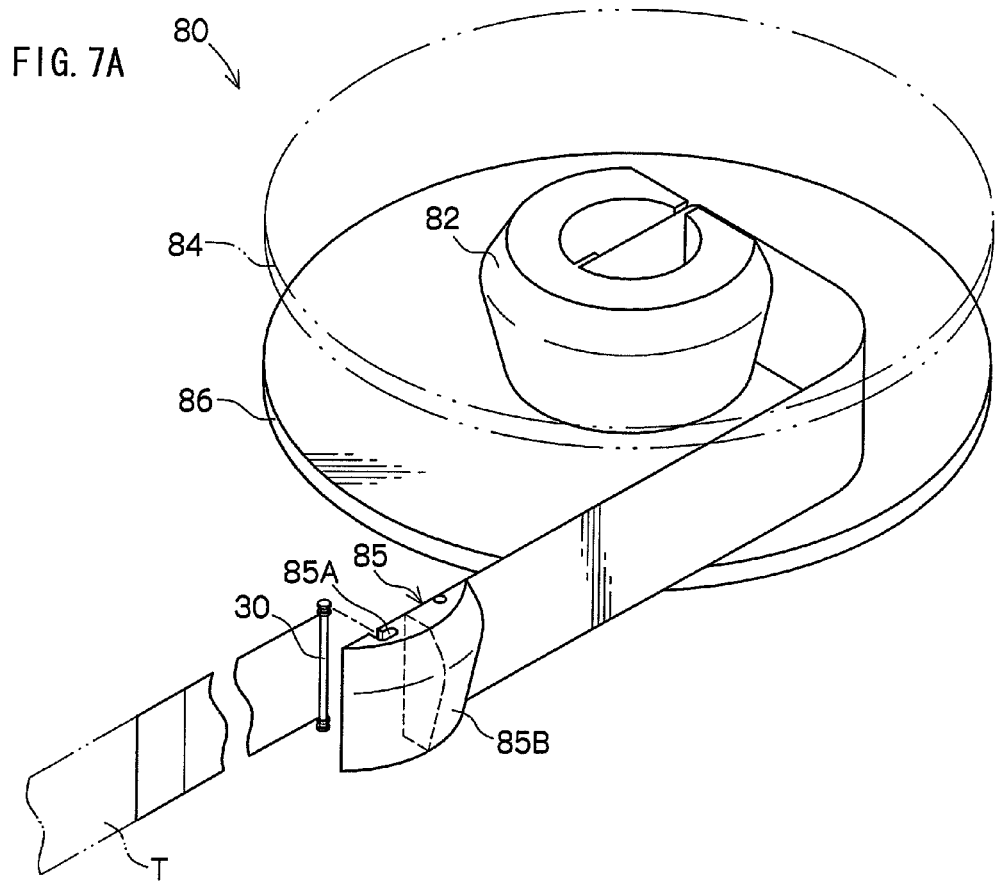
FIGS. 7A and 7B are schematic perspective views showing the structure of a pull-out member of a take-up reel.

Further, as shown in FIG. 7A, a similar configuration (a configuration which can structure the large diameter portion 82 when accommodated at the reel hub 82) must be formed also at a take-up surface 85B, which corresponds to the outer peripheral surface of the reel hub 82, of the leader block 85 which grasps and pulls-out the leader pin 30, so that there is no step between the take-up surface 85B and the substantially crowning-shaped configuration of the outer peripheral surface of the reel hub 82.

The outer diameters of the upper and lower both end portions of the reel hub 82 do not necessarily have to be the same at the upper flange 84 side and the lower flange 86 side, and it suffices for them to be smaller than the outer diameter of the large diameter portion 82A. However, it is preferable that the outer diameter of the end portion of the reel hub 82 at the one side toward which the large diameter portion 82A is offset be smaller than the outer diameter of the end portion of the reel hub 82 at the other side.

Namely, in the case of the take-up reel 80, it is preferable that the outer diameter of the end portion of the reel hub 82 at the upper flange 84 side is smaller than the outer diameter of the end portion of the reel hub 82 at the lower flange 86 side. Further, higher rigidities of the reel hub 82 are preferable, and the flexural modulus thereof is greater than or equal to 16.0 GPa, and preferably greater than or equal to 19.2 GPa.

The convex amount ΔR, which is the difference between the radius of the large diameter portion 82A of the reel hub 82 and the greater radius among those of the upper and lower both end portions, or the radius of the lower flange 86 side end portion in this case, is ΔR≦0.08 mm, and preferably, ΔR≦0.067 mm. Further, the ratio J (J=ΔR/G) of the convex amount ΔR with respect to the width G of the recording tape T (12.65 mm in this case) is J≦0.0063, and preferably, J≦0.0053. These points also are similar to the case of the reel hub 22.

Figure 18:
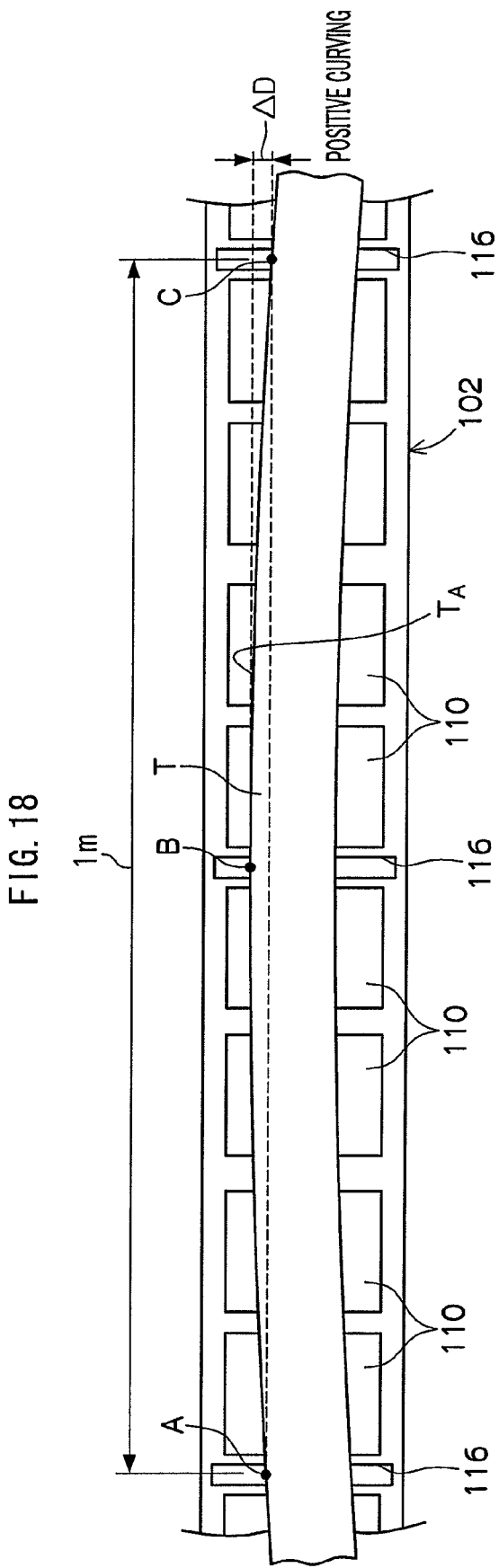
FIG. 18 is a schematic plan view showing a method of measuring the curving amount of a recording tape which has positive direction curving.
Figure 19:
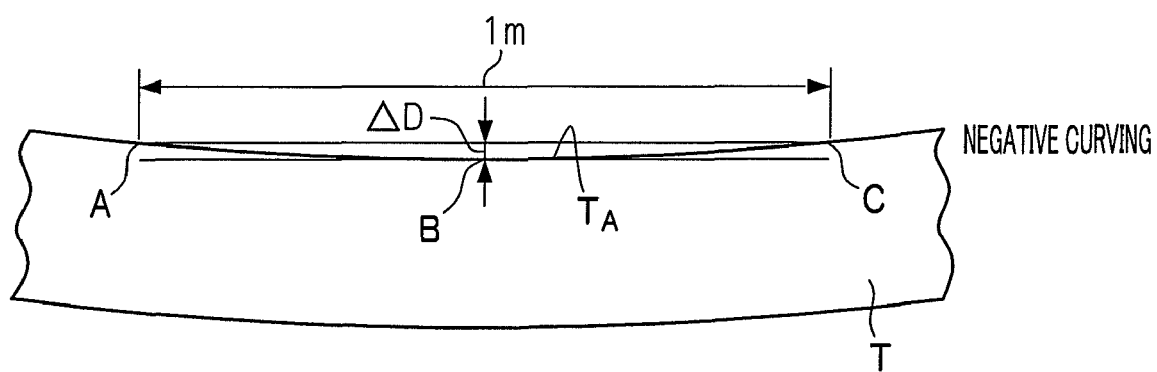
FIG. 19 is an explanatory drawing showing negative direction curving of the recording tape.

The curving (curving direction and curving amount) of the recording tape T will be described next. The recording tape is usually curved in the widthwise direction (upward or downward). In the present exemplary embodiment, curving toward the upper side is negative direction curving, and curving toward the lower side is positive direction curving. Accordingly, the recording tape T shown in FIG. 18 is the recording tape T having positive direction curving, and the recording tape T shown in FIG. 19 is the recording tape T having negative direction curving.

Figure 15:
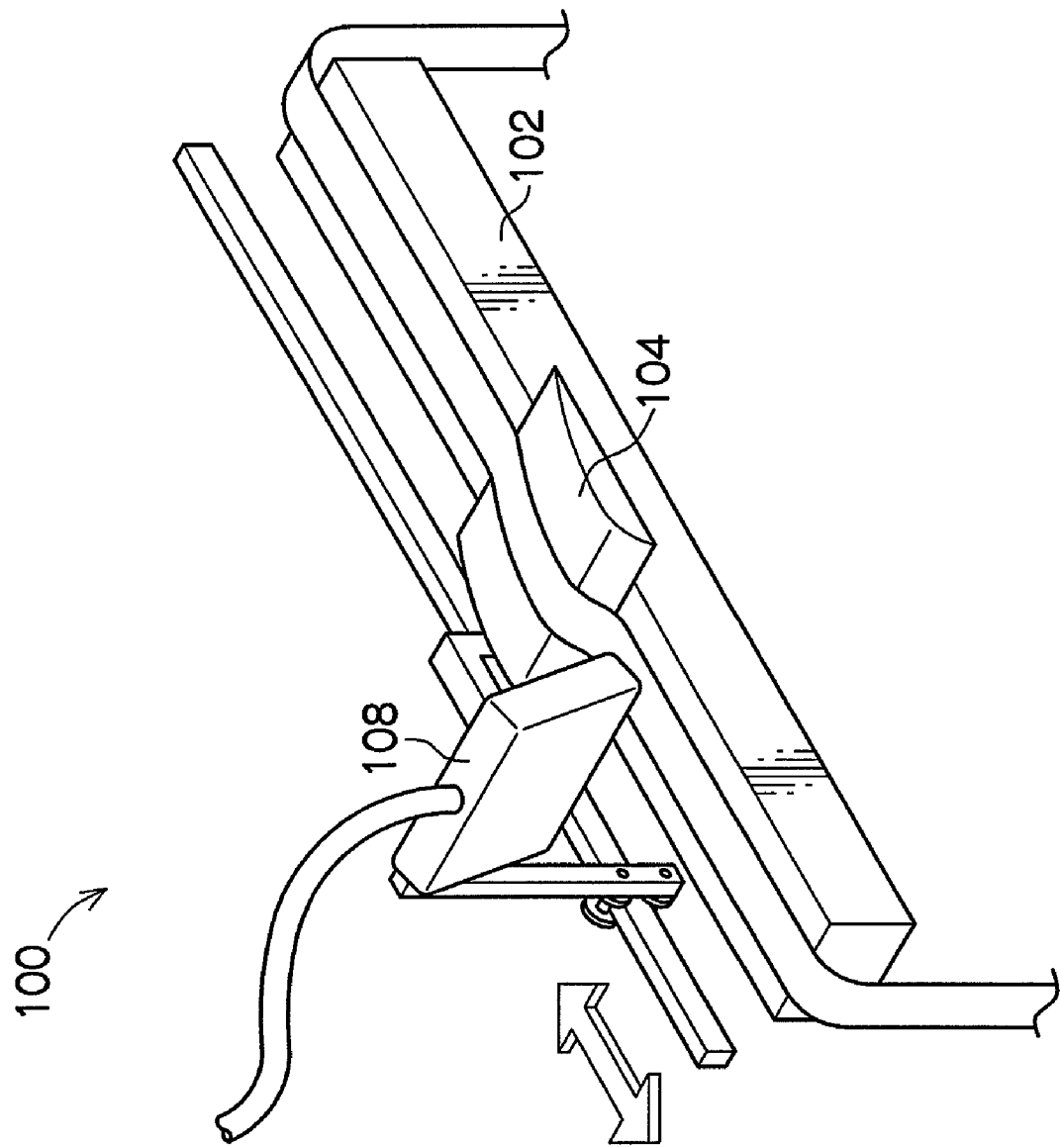
FIG. 15 is a schematic perspective view showing a tape shape measuring device which measures a curving amount of the recording tape.

Here, the method of measuring a curving amount ΔD of the recording tape T will be described. A tape shape measuring device 100 is shown in FIG. 15. The tape shape measuring device 100 has an electrostatic attracting stand 102 which is substantially parallelepiped. A guide member 104 is provided at the top portion of the electrostatic attracting stand 102.

As shown in FIG. 16A, the guide member 104 is structured so as to be able to move horizontally along the longitudinal direction of electrostatic attracting stand 102 on the top portion of the electrostatic attracting stand 102 in a state in which there is a gap between the guide member 104 and the top surface (an attracting surface 102A) of the electrostatic attracting stand 102. The recording tape T, which is cut in advance to a length at which margin portions are added to the both ends of a prescribed 1 m, is disposed on the attracting surface 102A of the electrostatic attracting stand 102 so as to be draped over the top surface of the guide member 104. Then, the both end sides of the recording tape T are freed in a state of having leeway in the length thereof, and air is blown-out onto the recording tape T by a nozzle 108.

Then, with the air being blown-out onto the recording tape T, the guide member 104 and the nozzle 108 are slid (moved) at a predetermined speed along the attracting surface 102A. In this way, the recording tape T is temporarily separated from the top of the attracting surface 102A, and is again guided on the attracting surface 102A in a state in which excess tension has been removed therefrom.

Figure 17:
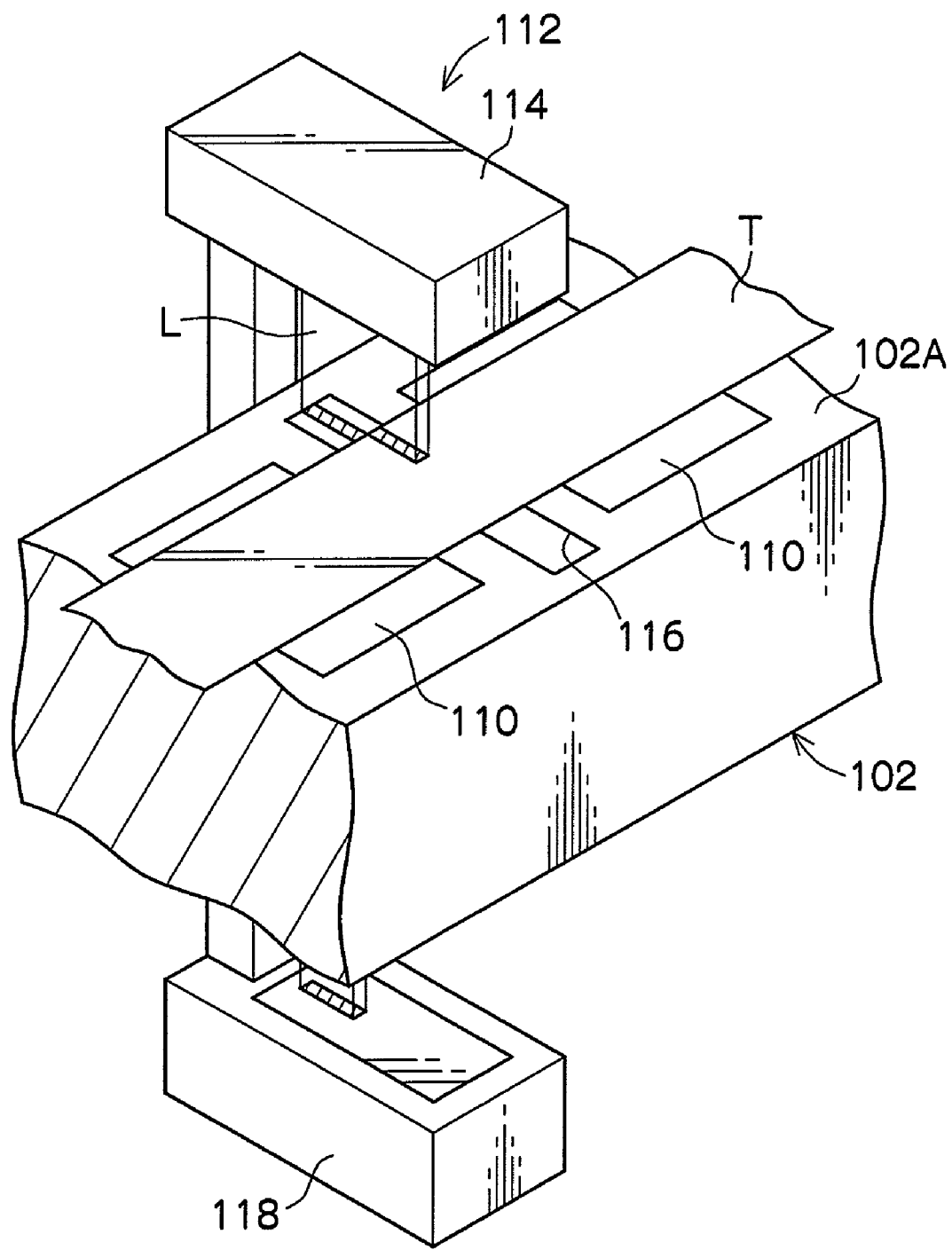
FIG. 17 is a schematic perspective view showing an optical measuring device used in order to measure the curving amount of the recording tape.

Further, as shown in FIG. 17, plural electrode pairs 110 are disposed at the electrostatic attracting stand 102 along the longitudinal direction. Together with the recording tape T being guided to the attracting surface 102A, switches of the electrode pairs 110 which correspond to the recording tape T guided to the attracting surface 102A are successively operated, such that the attracting surface 102A is successively charged in correspondence with the guiding of the recording tape T. In this way, the recording tape T is charged by static electricity (electrical charges), and is successively attracted to the attracting surface 102A by the electrostatic attraction.

Moreover, the air which is blown-out from the nozzle 108 presses the attracted recording tape T by a predetermined pressure. In this way, when the recording tape T is pressed by the predetermined pressure, the air which is interposed between the recording tape T and the attracting surface 102A is pushed out, accompanying the attracting surface 102A and the bottom surface of the recording tape T. Accordingly, the recording tape T can be stuck well to the attracting surface 102A.

Next, the shape of the recording tape T which is attracted to the attracting surface 102A is measured by an optical measuring device 112. Transparent portions 116, through which laser lights L irradiated from laser generating devices 114 of the optical measuring device 112 can pass, are provided at the electrostatic attracting stand 102. In the state in which the recording tape T is attracted to the attracting surface 102A, the laser lights L are irradiated to the transparent portions 116, and the laser lights L which pass-through are received at laser receiving devices 118 which are disposed beneath the electrostatic attracting stand 102. In this way, the positions of the edges of the recording tape T can be measured.

Specifically, as shown in FIG. 18, the laser lights L, which are strip-shaped in the transverse direction, are respectively illuminated (see FIG. 17) from the laser generating devices 114 which are disposed at the upper sides of measurement points A, B, C respectively, so as to extend across reference line AC which connects measurement point A and measurement point C. Then, the laser lights L which have passed through the respective transmitting portions 116 are respectively received by the laser receiving devices 118 which are disposed beneath the electrostatic attracting stand 102, i.e., at the lower sides of the measurement points A, B, C respectively. At this time, if the recording tape T is curved, the amounts of received lights of the laser lights L which are strip-shaped in the transverse direction (the transverse direction lengths of the laser lights L which have passed through) are small.

Next, the transverse direction lengths of the laser lights L which have passed through are detected by the laser receiving devices 118, and the positions of the measurement points A, B, C (an upper edge $T_A$ position) is determined. Then, on the basis of the positions of the measurement points A, B, C, the distance between the reference line AC and the measurement point B, i.e., a displacement amount ($\Delta D$) is calculated, and the calculated value is the curving value at measurement point B. Here, the length of the reference line AC being 1.0 m is stipulated in JISX6175.

Then, as shown in FIG. 18, if the side at which the radius of curvature of the curving of the tape edge of the recording tape T is small is the lower side in the drawing, i.e., if the reference line AC is covered by the recording tape T, the recording tape T is determined to have positive direction curving. As shown in FIG. 19 (note that FIG. 19 is a simplified version of FIG. 18), if the side at which the radius of curvature of the curving of the tape edge of the recording tape T is small is the upper side in the drawing, i.e., if there is a gap between the reference line AC and the upper side of the tape edge of the recording tape T (the so-called upper edge $T_A$), the recording tape T is determined to have negative direction curving. Note that, in the state in which the recording tape T is wound on the reel hub 22, the upper edge $T_A$ side is the upper flange 24 side of the reel hub 22.

Next, operation of the recording tape cartridge 10, which has the recording tape T and the reel 20 of the above-described structure, and the drive device 70 which has the take-up reel 80, will be described. As shown in FIG. 1, at times of non-use (during storage, transporting, or the like) when the recording tape cartridge 10 having the above-described structure is not loaded in the drive device 70 (see FIG. 4 through FIG. 7B), the opening 18 is closed by the door 50. When the recording tape T is to be used, the recording tape cartridge 10 is loaded into the drive device 70 along the direction of arrow A with its front wall 12A leading.

The recording tape cartridge 10 is inserted into an unillustrated bucket, and an opening/closing member (not shown) provided at the bucket (the drive device 70 side) engages with the convex portion 56 of the door 50. In this state, when the recording tape cartridge 10 moves further in the direction of arrow A, the opening/closing member moves the convex portion 56 relatively rearward against the urging force of the coil spring 58. In this way, the door 50, from which the convex portion 56 projects-out, slides rearward within the groove portions 64 and along the right wall 12B, and opens the opening 18.

When the recording tape cartridge 10 is loaded in the drive device 70 (the bucket) to a predetermined depth and the opening 18 is completely opened in this way, the bucket which is accommodating the recording tape cartridge 10 is lowered a predetermined height, and positioning members (not shown) of the drive device 70 are inserted relatively into hole portions for positioning (not shown) which are formed in the lower case 16. In this way, the recording tape cartridge 10 is positioned accurately at a predetermined position within the drive device 70, and further sliding of the door 50 (further movement of the door 50 rearward) is restricted.

Due to the movement of the recording tape cartridge 10 (the bucket) being lowered, the driving gear (not shown) relatively enters-in from the gear opening 40, meshes-together with the reel gear 44, and raises the reel 20 to a predetermined height. Then, in the state in which the driving gear and the reel gear 44 are completely meshed-together, the reel plate 46 is attracted and held by the magnetic force of an annular magnet (not shown) which is provided at the inner side of the driving gear. In this way, the reel 20 is set in a lock released state in which it can rotate relative to the case 12 within the case 12, while the meshing-together of the reel gear 44 with the driving gear is maintained.

The leader block 85 which is provided at the drive device 70 side enters into the case 12 from the opening 18 which has been opened, and grasps and pulls out the leader pin 30 which is positioned and held at the pin holding portions 36. Note that, because the recording tape cartridge 10 is accurately positioned within the drive device 70 at this time, the hooks 85A of the leader block 85 can reliably be made to anchor the annular grooves 32 of the leader pin 30. Further, because the rotation locked state of the reel 20 is released, the reel 20 can rotate as the leader pin 30 is pulled out.

Figure 7B:
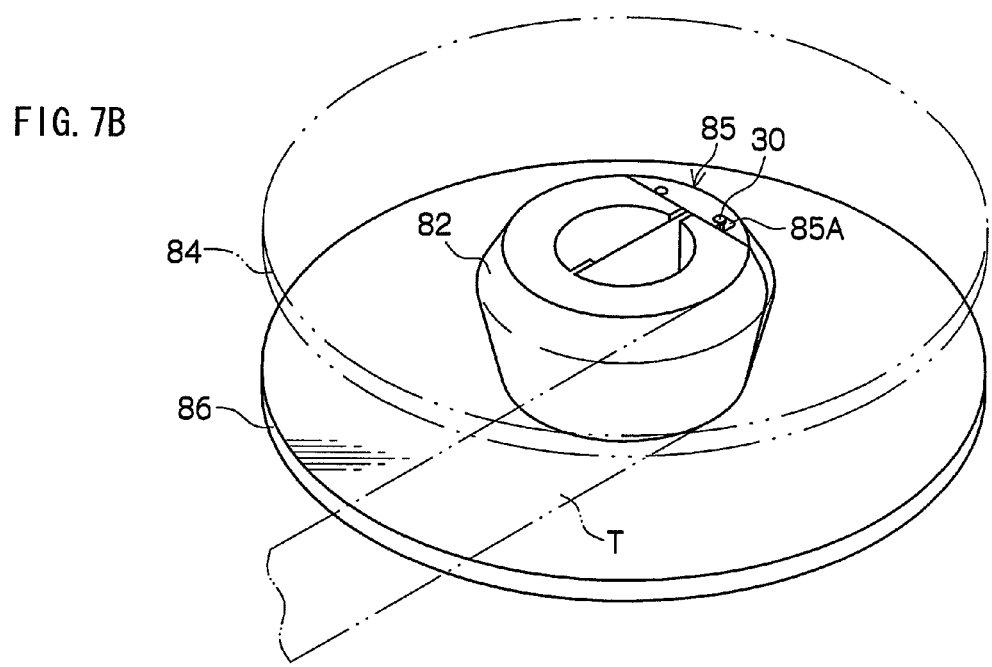

The leader block 85, which is grasping the leader pin 30 which is pulled out from the opening 18 in this way, is attached to (accommodated at) the reel hub 82 so as to structure a portion of the reel hub 82 by the take-up reel 82 rotating as shown in FIG. 7A and FIG. 7B. Then, by rotating and driving the take-up reel 80 and the reel 20 synchronously, the recording tape T is successively pulled out from the case 12 while being taken-up onto the take-up reel 80.

At this time, the recording tape T which is pulled out from the interior of the case 12 slidingly-contacts a tape guide 72 which is disposed nearest to the recording tape cartridge 10. The tape guide 72 is supported so as to rotate freely, and is assembled such that the heightwise position thereof is offset toward the center or toward one of the upper and lower positions, e.g., toward the lower position.

Accordingly, the recording tape T which slidingly-contacts the tape guide 72 travels in a state in which the edge of the upper end thereof is restricted by an upper flange 72A of the tape guide 72. Next, the recording tape T slidingly-contacts a tape guide 74 which is supported so as to rotate freely. The tape guide 74 is assembled such that the central position thereof in the width direction (heightwise direction) is offset to a position upward of the central position of the reel hub 22 in the width direction (heightwise direction). The edge of the lower end of the recording tape T is restricted by a lower flange 74B of the tape guide 74.

Then, the recording tape T, whose position is restricted by the tape guide 74, next slidingly-contacts a tape guide 76 which is supported so as to rotate freely. Note that, before slidingly-contacting the tape guide 76, the recording tape T slidingly-contacts a recording/playback head 88. Oppositely of the tape guide 74, i.e., in the same way as the tape guide 72, the tape guide 76 is assembled such that the central position thereof in the width direction (heightwise direction) is offset to a position downward of the central position of the reel hub 22 in the width direction (heightwise direction). The edge of the upper end of the recording tape T is restricted by an upper flange 76A of the tape guide 76.

The recording tape T, whose position is restricted by the tape guide 76, then finally slidingly-contacts a tape guide 78 which is supported so as to rotate freely. In the same way as the tape guide 74, the tape guide 78 is assembled such that the central position thereof in the width direction (heightwise direction) is offset to a position upward of the central position of the reel hub 22 in the width direction (heightwise direction). The edge of the lower end of the recording tape T is restricted by a lower flange 78B of the tape guide 78.

When the heightwise positions (width direction positions) of the respective tape guides 72 through 78 within the drive device 70 differ alternately along the tape path of the recording tape T in this way, there is the advantage that restricting of the width direction (vertical direction) position of the recording tape T can be carried out suitably. Note that, because the respective tape guides 72 through 78 are each supported so as to rotate freely, the edges of the recording tape T are seldom damaged by the respective tape guides 72 through 78.

Recording or playback of information is carried out due to the recording tape T slidingly-contacting the recording/playback head 88, which is disposed between the predetermined tape guides 74, 76, while the transverse direction (vertical direction) position of the recording tape T is restricted by the tape guides 72 through 78 in this way. Here, the recording/playback head 88 is supported so as to be able to move in the vertical direction (the heightwise direction) by, for example, an unillustrated actuator, and can move in the transverse direction of the recording tape T (the axial direction of the reel hubs 22, 82) following servo signals S (see FIG. 6) which are provided in advance on the recording tape T.

As shown in FIG. 6 for example, the servo signal S includes four (or five or the like) patterns P which are lined-up in parallel, and the patterns P are set in a substantially truncated V-shaped arrangement so as to form one group. A plurality of these groups of servo signals S which are formed in substantial truncated V-shapes are disposed in one line in a vicinity of each of the upper and lower end portions of the recording tape T, such that the widening sides thereof face outwardly.

It can be understood that, in accordance with such servo signals S, if the sensing time (distance) between each group of servo signals S (shown by W in FIG. 6) is long, the position of the recording tape T which is traveling is offset one of upward and downward with respect to the recording/playback head 88. Therefore, the vertical direction (heightwise direction) position of the recording/playback head 88 can be adjusted in accordance therewith.

At both the reel 20 and the take-up reel 80 of the present exemplary embodiment, the reel hubs 22, 82 are substantially shaped as crowns, and the upper flange 24 and the lower flange 26 are provided integrally with the reel hub 22, and the upper flange 84 and the lower flange 86 are provided integrally with the reel hub 82. Therefore, as will be described later, the reference for traveling is offset moderately toward the upper flange 24, 84 side end portions of the reel hubs 22, 82 from the widthwise direction substantially central portion sides of the reel hubs 22, 82.

Namely, in this way, fluctuations in the position of the recording tape T in the vertical direction (the axial direction of the reel 20 and the take-up reel 80) are suppressed suitably, and the traveling position of the recording tape T can be stabilized. Accordingly, by using the edge of the recording tape T, at the side toward which the large diameter portion 22A of the reel hub 22 is offset, as the reference for servo tracking control at the time when the recording tape T is traveling, the occurrence of reading errors of the servo signals S (servo tracking errors) and recording/playback errors of data signals (information) can be reduced.

The recording tape T, at which the recording or playback of information has been completed without errors due to the recording tape T slidingly-contacting the recording/playback head 88 while the heightwise position (width direction position) thereof is restricted by the respective tape guides 72 through 78 and the configurations of the reel hubs 22, 82 of the reel 20 and the take-up reel 80, is rewound onto the reel 20 due to the driving gear and the take-up reel 80 rotating reversely.

When the recording tape T is rewound on the reel 20 to the end and the leader pin 30 is held at the pin holding portions 36, the bucket accommodating the recording tape cartridge 10 rises a predetermined height, the positioning members (not shown) are pulled out from the hole portions for positioning (not shown), the driving gear is pulled out from the gear opening 40, and the meshing of the driving gear with the reel gear 44 is cancelled. Then, the reel 20 moves downward to its original heightwise position within the recording tape cartridge 10.

Thereafter, the recording tape cartridge 10 is moved in the direction opposite to the direction of arrow A by an unillustrated ejecting mechanism. Accompanying this movement, the door 50 slides in the direction of closing the opening 18 due to the urging force of the coil spring 58, and completely closes the opening 18 (returns to the initial state). The recording tape cartridge 10, whose opening 18 is closed in this way, is completely ejected from the drive device 70 (the bucket).

The operation and effects of the above-described reel 20 and take-up reel 80 will be described in detail next. Note that the operation and effects of the take-up reel 80 are substantially the same as the operation and effects of the reel 20.

Therefore, hereinafter, only description of the reel 20 will be given, and description of the take-up reel 80 will be omitted fittingly.

As shown in FIG. 3, the reel 20 is structured such that the reel hub 22 is molded integrally with the lower flange 26, and the upper flange 24 is welded to the reel hub 22. Namely, the upper and lower flanges 24, 26 are provided integrally with the reel hub 22. Further, the large diameter portion 22A, which makes the reel hub 22 into a substantial crowning shape, is formed further toward the upper flange 24 side than the widthwise direction central portion E1 of the reel hub 22. Note that the offset amount ΔH of the large diameter portion 22A, which is from the widthwise direction central portion E1 of the reel hub 22 to the widthwise direction central portion E2 of the large diameter portion 22A, is 5% to 40%, and preferably 8% to 24%, of the width H of the reel hub 22.

The recording tape T which has negative direction curving is wound on the reel 20 as shown in FIG. 8A through FIG. 8C. At this time, due to the tight-winding force F of the recording tape T, the reel hub 22 gradually deforms as shown by the dashed lines in the figures as the recording tape T is wound. Further, because the upper flange 24 and the lower flange 26 are provided integrally with the reel hub 22, following the deformation of the reel hub 22, the upper flange 24 and the lower flange 26 gradually deform (shown by the two-dot chain lines in FIGS. 8B and 8C) such that the interval between the flanges narrows as the recording tape T is wound.

In particular, the lower flange 26 side end portion of the reel hub 22, toward which the large diameter portion 22A is not offset, is formed to be larger than the outer diameter of the upper flange 24 side end portion (the upper flange 24 side end portion whose outer diameter is small is the side at which the large diameter portion 22A is provided). Therefore, due to the tight-winding force F of the recording tape T, the lower flange 26 side end portion deforms more greatly than the upper flange 24 side end portion. Namely, the amount of deformation of the lower flange 26 is greater than the amount of deformation of the upper flange 24. Accordingly, the recording tape T is wound so as to be offset toward the upper flange 24 side end portion from the widthwise direction substantially central portion of the reel hub 22.

Note that this is a case in which the upper and lower flanges 24, 26 are provided integrally with the reel hub 22. In a case in which the upper and lower flanges 24, 26 are not provided integrally, they hardly deform at all even if the reel hub 22 deforms, and therefore, the upper and lower flanges 24, 26 in the drawings are not changed to be at substantially the same position as the upper and lower flanges 24, 26 shown by the solid lines in the drawings. Further, the reel 20 shown in FIG. 8A through FIG. 8C is drawn schematically, and is of course drawn exaggeratedly for easier understanding.

FIG. 9A and 9B show positions of the upper edge of the wound recording tape T (wound surface of the recording tape T). FIGS. 9A and 9B show sectional views in the vertical direction of the reel hub 22 of every upper edge of the recording tape T which is wound around the reel hub 22. As shown in FIGS. 9A and 9B, generally, the recording tape T having negative direction curving tends to be wound so as to be offset toward the upper flange 24 side end portion of the reel hub (this reel hub is a reel hub which is not substantially crowning-shaped). The recording tape T having positive direction curving tends to be wound so as to be offset toward the lower flange 26 side end portion of the reel hub (this reel hub is a reel hub which is not substantially crowning-shaped).

Further, generally, in the case of a reel hub having a large diameter portion whose outer diameter is larger than the outer diameters of the upper and lower both end portions (including barrel-shaped reel hubs), the recording tape T tends to be wound so as to be offset toward the large diameter portion. Accordingly, in the case of the reel 20 of the present exemplary embodiment, by winding the recording tape T having negative direction curving onto the reel hub 22, the recording tape T is not offset excessively toward the upper flange 24 side, and the recording tape T can be wound substantially along the inner surface of the upper flange 24 (the taper surface 24A).

Namely, at the reel 20 of the present exemplary embodiment, because the large diameter portion 22A at the reel hub 22 is offset by a predetermined amount (the offset amount ΔH) toward the upper flange 24 side end portion, the recording tape T which has negative direction curving is wound so as to be offset moderately toward the upper flange 24 side end portion of the reel hub 22 from the widthwise direction substantially central portion side of the reel hub 22, and the ability of the recording tape T to be wound orderly (regular winding) can be improved.

Further, as described above, at the reel 20 of the present exemplary embodiment, the reel hub 22 deforms due to the tight-winding of the recording tape T, and the upper and lower flanges 24, 26 which receive the effects of this deformation (and the lower flange 26 in particular) deform such that the interval between the flanges is narrowed. For this reason as well, the recording tape T can be wound so as to be offset toward the upper flange 24 side end portion of the reel hub 22. Accordingly, the recording tape T being wound while fluctuating in the axial direction (widthwise direction) of the reel hub 22 caused by the tape curving is suppressed, and the wound posture of the recording tape T can be made to be substantially good.

Note that, in the present exemplary embodiment, the absolute value of the curving amount ΔD of the recording tape T (see FIG. 18 and FIG. 19) is ΔD=0.20 mm to 2.50 mm, and preferably ΔD=0.20 mm to 2.00 mm. If the curving amount ΔD of the recording tape T is less than 0.2 mm, the directivity of the recording tape T (the direction in which the recording tape T moves as it is wound) is not fixed, and, conversely, there is the concern that the position of the recording tape T will fluctuate.

Further, if the curving amount ΔD of the recording tape T is greater than 2.50 mm, the recording tape T is pushed excessively toward the upper flange 24 side or the lower flange 26 side or interferes with the upper flange 24 or the lower flange 26, and there is the concern that the edges of the recording tape T will be damaged or that the traveling position of the recording tape T will become offset excessively toward one side. By setting the curving amount ΔD within the aforementioned range, an even more proper and stable traveling position of the recording tape T, and a state in which the amount of disorder in winding of the recording tape T is small, can be realized.

Table 1 shows the curving amounts ΔD of the recording tapes T and states of the tape edges. From the results of Table 1, it can be understood that problems do not arise at the tape edges when the curving amount ΔD of the recording tape T is in the range of ΔD=0.20 mm to 2.50 mm.

TABLE 1

| | curving amount (mm) of recording tape | state of tape edges* |
|---|---|---|
| 1 | 0.1 | Δ |
| 2 | 0.2 | ⊚ |
| 3 | 0.5 | ⊚ |

TABLE 1-continued

| | curving amount (mm) of recording tape | state of tape edges* |
|---|---|---|
| 4 | 1.0 | ◎ |
| 5 | 1.5 | ◎ |
| 6 | 2.0 | ◎ |
| 7 | 2.5 | ○ |
| 8 | 3.0 | Δ |

*◎: extremely good; ○: good; Δ: somewhat good; X: poor

Figure 10A:
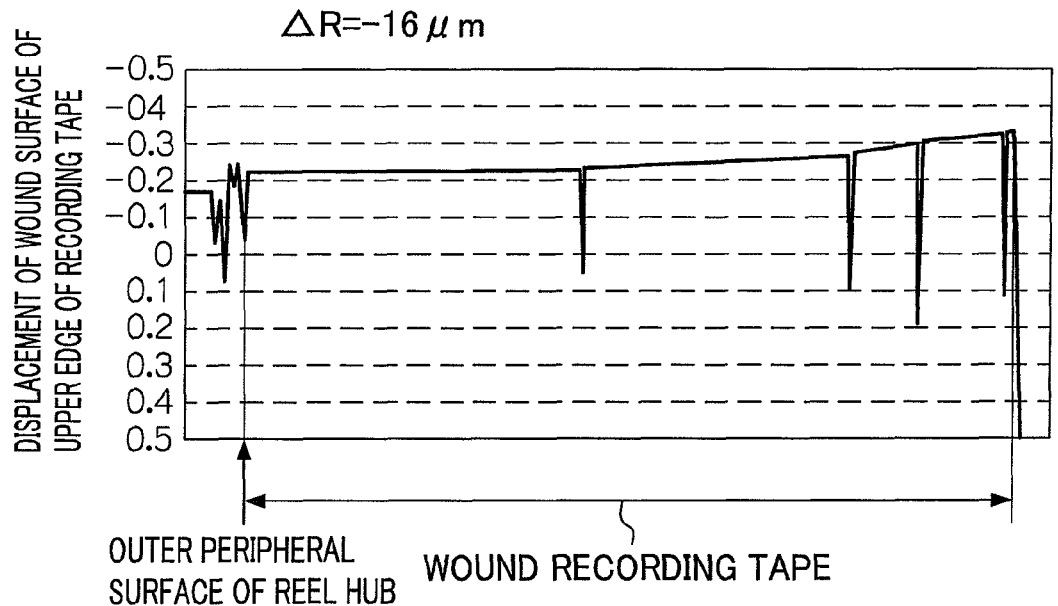
FIG. 10A is a wound posture measurement chart of a recording tape having negative direction curving in a case in which $\Delta R=-16$ μm and the flange interval is a conventional interval.
Figure 10B:
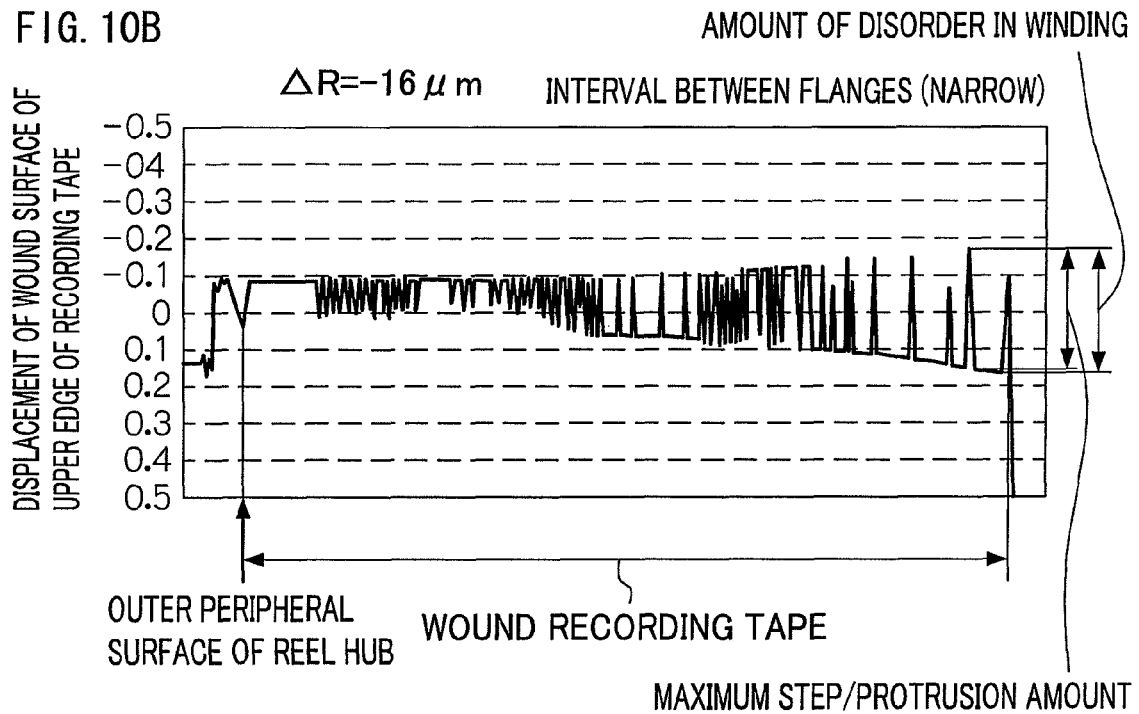
FIG. 10B is a wound posture measurement chart of a recording tape having negative direction curving in a case in which $\Delta R=-16$ μm and the flange interval is narrower than a conventional interval.

The convex amount ΔR of the large diameter portion 22A at the reel hub 22 which is formed in a substantial crowning shape will be further described next. FIG. 10A through FIG. 11B are wound posture measurement charts showing the position of the edge $T_A$ (see FIG. 18 and FIG. 19), in the radial direction of the reel 20, of the recording tape T which is wound on the reel hub 22. Note that FIG. 10A and FIG. 11A show cases of the reel 20 at which the interval between the flanges is formed to be similar to that of the conventional case (the clearance K is, for example, K=0.30 mm). FIG. 10B and FIG. 11B show cases of the reel 20 at which the interval between the flanges is made to be more narrow than the conventional case (the clearance K is K=0.10 mm to 0.18 mm).

Further, FIG. 10A and FIG. 10B show cases in which the recording tape T is wound on a conventional reel hub (not shown) which is not formed in a crowning shape (is actually slightly hourglass-shaped, and when expressing a hourglass shape as negative with respect to a crowning shape, ΔR=−16 μm). FIG. 11A and FIG. 11B show cases in which the recording tape T is wound on the reel hub 22 whose convex amount ΔR is ΔR=45 μm.

Note that the "maximum step/protrusion amount" shown in FIG. 10B for example is the maximum value of either of the step or the protrusion amount of the wound posture measurement chart, and is the maximum value of the amount of change by which the recording tape T protrudes locally from the overall wound surface of either edge in the widthwise direction of the recording tape T. Further, "amount of disorder in winding" is an amount computed by subtracting the minimum value from the maximum value of the wound posture measurement chart, and includes steps, protrusion, tilting of the wound surface of either edge in the widthwise direction of the recording tape T, and the like.

Figure 12:
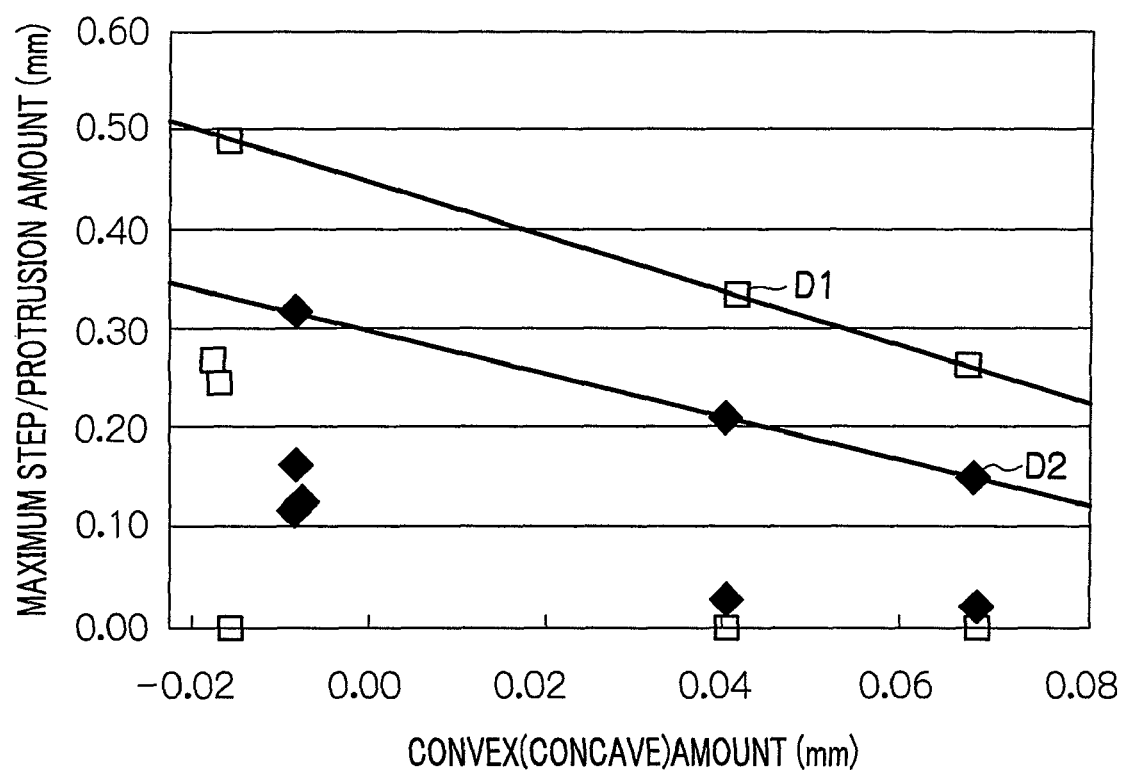
FIG. 12 is a graph showing the relationship between a convex amount and a maximum step/protrusion amount.

Further, FIG. 12 is a graph showing the relationship between the convex amount ΔR and the maximum step/protruding amount. Namely, the convex amount ΔR is on the horizontal axis, and the maximum step/protrusion amount is on the vertical axis. Further, the white, square dots D1 show the case of the reel 20 at which the interval between the flanges is similar to that of the conventional case (the clearance K is, for example, K=0.30 mm). The black, diamond-shaped dots D2 show the case of the reel 20 at which the interval between the flanges is made to be more narrow than is the case conventionally (the clearance K is K=0.10 mm to 0.18 mm).

Following Table 2 shows reduced values of the maximum step/protrusion amount in accordance with changes in the convex amount ΔR, and the reduced values of the maximum step/protrusion amount in accordance with differences in the interval between the flanges, respectively in cases which are based on the maximum step/protrusion amount at the reel hub of the first reel (not shown) at which the large diameter portion 22A is not formed (the reel hub is actually slightly hourglass-shaped, and when expressing an hourglass shape as negative with respect to a substantial crowning shape, ΔR=−16 μm) and at which the interval between the flanges is made to be similar to that of the conventional case (the clearance K is, for example, K=0.30 mm), and the maximum step/protrusion amount at the reel hub of a second reel (not shown) at which the large diameter portion 22A is not formed (the reel hub is actually slightly hourglass-shaped, and when expressing an hourglass shape as negative with respect to a substantial crowning shape, ΔR=−8 μm) and at which the interval between the flanges is made to be narrow (the clearance K is, for example, K=0.15 mm).

TABLE 2

| reel + convex amount ΔR (μm) | maximum step/protrusion amount (mm) | difference with first reel (ΔR = −16 μm, K = 0.30 mm) | difference with second reel (ΔR = −8 μm, K = 0.15 mm) | state of wound surface* |
|---|---|---|---|---|
| First Reel | 0.487 | | | |
| + convex amount 35-46 | 0.350 | 0.137 (−28%) | | ○ |
| + convex amount 67 | 0.270 | 0.217 (−45%) | | ○ |
| Second Reel | 0.323 | 0.164 (−33%) | | ○ |
| + convex amount 35-46 | 0.225 | 0.262 (−54%) | 0.098 (−30%) | ○ |
| + convex amount 67 | 0.160 | 0.327 (−67%) | 0.163 (−51%) | ○ |

*○: good (no cinching, uneven winding), X: poor (cinching, uneven winding exhibited)

The following can be understood from the results of FIG. 10A through FIG. 12 and Table 2. Namely, even if the interval between the flanges is wide (even if K=0.30 mm) as is the case with the conventional reel, if there is even a slight convex amount ΔR (e.g., even if ΔR≦0.067 mm (67 μm)), the interval between the flanges can be narrowed well by the deformation of the reel hub 22 due to the tight-winding of the recording tape T. Therefore, the maximum step/protrusion amount and the amount of disorder in winding can be sufficiently reduced. Further, at the reel 20 at which the interval between the flanges is made narrow from the start (K=0.15 mm), the effect can be even further improved.

In this way, at the reel 20 at which the upper and lower flanges 24, 26 are provided integrally with the reel hub 22, if a convex shape (substantial crowning shape) is given to the reel hub 22, even if the convex amount ΔR is rather small (ΔR≦0.08 mm, see FIG. 12), the step or protrusion amount of the wound surface of the tape edge in the widthwise direction (amount of disorder in winding) of the recording tape T can be made to be much smaller. This is because, at the reel 20 in the present exemplary embodiment, as the reel hub 22 deforms due to tight-winding of the recording tape T, the upper and lower flanges 24, 26 deform such that the interval therebetween narrows.

Namely, in accordance with the reel 20 in the present exemplary embodiment, as shown in FIG. 11 and in Table 2, by prescribing the thickness of the recording tape T, the distance between the upper and lower flanges 24, 26, the convex amount ΔR and the like, not only are there the configurational effects of the substantially crowning shape itself of the reel hub 22, but also, due to the synergistic effect with the deformation of the upper and lower flanges 24, 26 (the deformation in which the interval between the flanges narrows) which is linked with the deformation of the reel hub 22, a state in which there is a small amount of disorder in winding can be sufficiently realized within a range of the convex amount ΔR which is smaller than that of conventional techniques.

Further, it has been empirically confirmed that, if the convex amount ΔR is ΔR≦0.08 mm (80 μm), more preferably the convex amount ΔR is ΔR≦0.067 mm (67 μm), desirable result can be obtained. If the convex amount ΔR is ΔR≧0.08 mm (80 μm), or expressed in terms of the ratio J, if J>0.0063, there is an increased probability that, at the wound surface of the recording tape T in a vicinity of the outer peripheral surface of the reel hub 22, plastic deformation of the recording tape T itself which is called uneven winding, cinching, undulating, or the like, or gaps between the layers of the recording tape T, will arise at the reel 20 at which the upper and lower flanges 24, 26 are provided integrally with the reel hub 22.

Moreover, in the range in which the convex amount ΔR is 0.067 mm (67 μm)<ΔR≦0.08 mm (80 μm), or, expressed in terms of the ratio J, which is the ration of the convex amount ΔR with respect to a width G of the recording tape T, 0.0053<J≦0.063, there are no particular problems, but there is the possibility of being easily affected by the thickness of the recording tape T and the rigidity of the reel hub 22. In order to reliably ensure the quality of the tape edges, it is preferable that ΔR≦0.067 mm (67 μm), or, expressed in terms of the ratio J, J≦0.0053.

Note that the numerical figures in these experimental data are a case in which the thickness of the recording tape T is less than or equal to 7.5 μm. If the recording tape T is thicker, these numerical figures also will change. In a case in which a recording tape T of a thickness of at least 6.6 μm was wound on a reel hub 22 which was made of 10% glass fiber reinforced PC resin and had a wall thickness of 2.5 μm, uneven winding and the like did not arise at the wound surface when the convex amount ΔR was to around ΔR=0.08 mm. However, it has been empirically confirmed that, when ΔR is greater than 0.08, deformation in an undulating shape, cinching, and the like arose. In this way, the thickness of the recording tape T being thin has a high possibility of affecting the occurrence of deformation in an undulating shape and cinching.

As described above, in accordance with the reel 20 relating to the present exemplary embodiment, at times of winding the recording tape T on the reel hub 22 (including the time of manufacturing the reel 20 and times of rewinding the recording tape T for removal from the drive device 70), the recording tape T can be wound so as to be offset toward the upper flange 24 side while tape edge damage due to excessive offset toward one side is reduced, due to the recording tape T being wound such that the side at which the radius of the curvature of the curving thereof is small faces the upper flange 24 side where the large diameter portion 22A is formed. Accordingly, positional fluctuations of the recording tape T in the axial direction of the reel hub 22 can be suppressed, the maximum step/protrusion amount of the recording tape T can be reduced, the occurrence of disorder in winding can be suppressed, and the amount of disorder in winding can be reduced.

Accordingly, even if an impact is applied to the recording tape cartridge 10 (the reel 20) at the time of being transported or at the time of being handled, the occurrence of the problem of the edges of the recording tape T being bent (tape edge damage) can be prevented. In particular, at the reel 20 relating to the present exemplary embodiment, it is possible to reduce a single wound section of the recording tape T protruding-out from the wound surface, i.e., the frequency of occurrence of the phenomenon in which a single wound section of the recording tape protrudes-out. Therefore, even if, in accordance with an increase in the recording capacity, the recording tape T is made to be thin (e.g., even if it is made to be 6.6 μm), the problem of a single, protruded wound section of the recording tape T being bent (tape edge damage) can be prevented from occurring.

When the drive device 70 causes the recording tape T to travel, the recording tape T, which has negative direction curving and which is drawn-out from the reel 20, is wound onto the reel hub 82 in which the large diameter portion 82A is offset toward the upper flange 84 side by the offset amount ΔH, in the same way as the reel hub 22. Therefore, the reference for traveling is moderately offset toward the upper flange 84 side end portion of the reel hub 82 from the widthwise direction substantially central portion side of the reel hub 82. Accordingly, at the take-up reel 80 as well, the recording tape T can be wound so as to be offset toward the upper flange 84 side while tape edge damage caused by excessive offset toward one side is mitigated.

Namely, the traveling position of the recording tape T, which is drawn-out from the reel 20, can thereby be stabilized at the proper position, and positional fluctuations in the vertical direction (the axial direction of the reel hub 82) while the recording tape T is traveling can be suppressed. Accordingly, tape edge damage, such as bending of the edges or the like which arises due to contact with the tape guides 72 through 78 or the flanges 84, 86 of the take-up reel 80 which are provided at the drive device 70, or with the flanges 24, 26 of the reel 20, or the like, as well as generation of abraded powder due thereto, can be prevented.

In particular, abraded powder not only sticks to the recording tape T and may cause errors and drop-out, but also may stick to the recording/playback head 88 and may cause failure. Therefore, it is extremely effective to be able to prevent this. In this way, even at high-density-recording drive devices 70, the occurrence of reading errors of the servo signals S and recording/playback errors of the data signals (information) can be reduced. In addition, a reduction in position error signals and off-track can be expected.

Note that the orientation of the curving of the recording tape T can be changed by heat treatment. Namely, by carrying out an appropriate heat treatment in a state in which the recording tape T is wound on a reel (not shown) at which the outer peripheral surface of the reel hub 22 is formed in a taper shape, uniform curving can be imparted and a good curl can be applied due to the shape fixing effects caused by creeping. In the present exemplary embodiment, the recording tape T which has negative direction curving is used. However, the recording tape T which has positive direction curving may of course be used if the large diameter portion 22A is offset toward the lower flange 26 side. The reference of traveling in this case is the lower flange 26 side.

In addition, in the present exemplary embodiment, the reel hub 22 and the lower flange 26 are integrally molded, but the reel hub 22 and the lower flange 26 may be separately molded and welded each other. The reel hub 22 and the upper flange 24 may also be integrally molded, and moreover, the reel hub 22, the upper flange 24 and the lower flange 26 may also be integrally molded. Further, the present exemplary embodiment is an example which is applied to the recording tape cartridge 10 which is configured so as to accommodate the single reel 20 within the case 12. However, the present invention is not limited to this and may be applied to, for example, a two-reel recording tape cassette in which two reels are accommodated within a case.

A tape reel of a first aspect of the present invention has a hub on which a recording tape is wound, and flanges provided at both end portions of the hub. The hub has a large diameter portion whose diameter is larger than diameters of both widthwise direction (axial direction) end portion sides. The large diameter portion is offset, from a widthwise direction central portion of the hub, toward one flange side or another flange side.

In accordance with the above-described aspect, when the recording tape is wound on the hub, it can be wound so as to be offset toward either one end portion side from the widthwise direction substantially central portion of the hub. Therefore, positional fluctuations in the axial direction of the hub can be suppressed. Accordingly, the traveling position of the recording tape can be stabilized, and tape edge damage, which occurs due to contact with the tape guides or the flanges of the take-up reel provided at the drive device, or with the flanges of the tape reel, or the like, can be prevented. Accordingly, even at high-density-recording drive devices, the occurrence of reading errors of servo signals and recording/playback errors of data signals can be reduced, and a reduction in position error signals and off-track can be expected.

Moreover, because positional fluctuations of the recording tape in the axial direction of the hub can be suppressed, disorder in winding of the recording tape can be suppressed, and regular winding of the recording tape may be realized. Accordingly, the phenomenon in which a single wound section of the recording tape protrudes out can be prevented. The occurrence of the problem of a protruding single wound section of the recording tape being bent (tape edge damage) at the time of being transported or at the time of being handled can be prevented.

When a recording tape is wound onto a taper-shaped hub for example, the recording tape is cumulatively pushed against one flange side strongly. Therefore, the recording tape is offset excessively toward the one flange, and there is the concern that the tape edge will be strongly pushed against that flange and damaged. Further, when the recording tape is pushed too strongly against one flange side in this way, there is the concern that, due to the reaction caused thereby, the phenomenon in which a single wound section of the recording tape protrudes out will arise. This phenomenon is particularly marked when the recording tape is made to be thin. However, at the tape reel relating to the present invention, because positional fluctuations of the recording tape in the axial direction of the hub can be suppressed due to the above-described effects of the large diameter portion, cumulative, strong pushing of the recording tape against one of the flanges is reduced. Accordingly, it becomes difficult for damage to the tape edges and for the phenomenon of protruding of a single wound section of the recording tape to occur.

In the above-described aspect, a widthwise direction central portion of the large diameter portion may be offset, from the widthwise direction central portion of the hub, toward either one flange side by 5% to 40% of a width of the hub.

In accordance with the above-described aspect, offsetting the recording tape toward either one end portion side from the widthwise direction substantially central portion of the hub when the recording tape is wound on the hub, can be accomplished well. Namely, if the aforementioned offset amount is less than 5%, the recording tape cannot be offset well toward one end portion side. On the other hand, if the offset amount is greater than 40%, the recording tape is excessively offset toward one end portion side. Note that the offset amount is preferably 8% to 24% of the width of the hub. In this range, good effects can be achieved even if the curving of the recording tape is large to a certain extent.

In the above-described aspect, the radii of one end portion side and another end portion side of the hub may be different, and the large diameter portion may be offset toward the end portion side whose radius is small.

Further, in the above-described aspect, the recording tape may be wound around the hub such that a side of the recording tape where a radius of curvature of curving of a tape edge is small is at a side toward which the large diameter portion is offset.

In accordance with the above-described respective aspects, even if the recording tape is curved, it is possible to suppress the recording tape being wound while fluctuating in the widthwise direction of the hub, and the recording tape can be wound so as to be offset toward one flange side. Accordingly, a proper and stable traveling position of the recording tape, and a state in which the amount of disorder in winding is small, can be realized.

In the above-described aspect, a clearance, which is calculated by deducting a width of the recording tape from an interval between upper and lower flanges at an outer peripheral surface of the hub, maybe 0.10 mm to 0.18 mm.

According to the above aspect, when the hub and the flange are integrally molded, the interval between the flanges can be narrowed well by deformation of the hub resulting from the tight-winding of the recording tape. Consequently, a state in which the amount of disorder in winding is small can be realized, and the traveling position of the recording tape can be stabilized at the appropriate position.

Note that when the clearance is greater than 0.18 mm, unevenness and protrusion amount of the wound surface of every recording tape edge become greater, and even when the clearance is less than 0.10 mm to about 0.05 mm, the effect that the flanges can be narrowed well is expected, but when the clearance is less than or equal to 0.05 mm, the potential for the flanges to contact a member for adhesion when the recording tape is adhered to the hub is large, and implementation in actual process becomes difficult.

By "integrally" noted above means a configuration where deformation of the hub and deformation of the flanges are linked to/affect each other. That is, this means a configuration where the flanges deform in accompaniment with deformation of the hub or where the hub deforms in accompaniment with deformation of the flanges. Specific examples include an instance where the hub and the flanges are integrally molded and an instance where the flanges are welded to the hub.

Further, in the above-described aspect, a ratio of a difference between a larger radius among radii of both end portions of the hub, and a radius of the large diameter portion, with respect to a width of the recording tape may be less than or equal to 0.0063.

In accordance with the above-described aspect, in cases in which the hub and the flanges are formed integrally, even if the difference between the larger of the radii of the both end portions of the hub, and the radius of the large diameter portion, is slight, the interval between the pair of flanges is narrowed as the hub deforms due to tight-winding of the recording tape. Therefore, a state in which the amount of disorder in winding is small can be realized. Accordingly, the occurrence of tape edge damage can be prevented.

Note that the width of the recording tape is the mean value of a tolerance width and a standard value relating to the tape width of the recording tape at the drive device in which that recording tape is used. Further, the ratio of the difference between the larger radius of the both end portions of the hub and the radius of the large diameter portion, with respect to the width of the recording tape, is preferably less than or equal to 0.0053.

In the above-described aspect, a width of the recording tape may be substantially 12.65 mm, and a difference between a larger radius among radii of both end portions of the hub, and a radius of the large diameter portion, may be less than or equal to 0.08 mm.

In accordance with the above-described aspect, in cases in which the hub and the flanges are formed integrally, even if the difference between the larger of the radii of the both end portions of the hub, and the radius of the large diameter portion, is slight, the interval between the pair of flanges is narrowed as the hub deforms due to tight-winding of the recording tape. Therefore, a state in which the amount of disorder in winding is small can be realized. Accordingly, the occurrence of tape edge damage can be prevented.

Note that the difference between the larger of the radii of the both end portions of the hub, and the radius of the large diameter portion, is preferably less than or equal to 0.067 mm. If this difference is larger than 0.08 mm, damage may arise at the tape edges. In the range of greater than 0.067 mm to less than or equal to 0.08 mm, there is the possibility of being affected by the thickness of the recording tape and the rigidity of the hub. In order to reliably ensure the quality of the tape edges, it is preferable that the difference is less than or equal to 0.067 mm.

A recording tape cartridge of a second aspect of the present invention has the tape reel of the first aspect of the present invention, and a case which accommodates the tape reel rotatably.

In accordance with the above-described aspect, effects which are substantially the same as the effects of the tape reel of the first aspect of the present invention can be obtained at a recording tape cartridge. In particular, there is and will be the trend to make recording tapes thinner in order to increase the recording capacity per recording tape cartridge. Accordingly, the rigidity of the recording tape decreases, and the strength of the tape edges also decreases. However, because it is difficult for the recording tape to hit against the flanges and the like as described above, the frequency of the occurrence of tape edge damage due to the recording tape hitting the flanges or the like, and the protruding-out of a single wound section of the recording tape which is caused due to the recording tape hitting the flanges or the like, can be kept low.

In the above-described aspect, the tape cartridge may have a single tape reel configuration.

In accordance with the above-described aspect, at the reel, the ability of the recording tape to be wound orderly can be improved, and positional fluctuations in the axial direction of the hub (the direction orthogonal to the traveling direction of the recording tape) at the time when the recording tape travels can be suppressed. Therefore, fluctuations of the recording tape in the widthwise direction (the direction orthogonal to the traveling direction of the recording tape) at the reel at the recording tape cartridge, which fluctuates due to the take-up reel in the drive device, can be suppressed. Accordingly, the present aspect is suited to single-reel recording tape cartridges for data back-up of computers for which a high recording capacity is desired.

In the above-described aspect, the recording tape may have servo signals that are a reference for positioning of a recording/playback head in a drive device, and a tape edge of the recording tape wound on the hub, which tape edge is at a side toward which the large diameter portion of the hub is offset, may be a reference for servo tracking control when the recording tape travels.

In accordance with the above-described aspect, because the traveling position of the recording tape can be stabilized, the occurrence of reading errors of servo signals and recording/playback errors of data signals can be reduced.

A take-up reel of a third aspect of the present invention is a take-up reel provided within a drive device and on which is wound a recording tape pulled-out from a recording tape cartridge, the take-up reel having: a hub on which the recording tape is wound; and flanges provided at both end portions of the hub, wherein the hub has a large diameter portion whose diameter is larger than diameters of both end portion sides thereof, and the large diameter portion is offset, from a widthwise direction (axial direction) central portion of the hub, toward one flange side or another flange side.

In accordance with the above-described aspect, effects which are substantially the same as the effects of the tape reel of the first aspect of the present invention can be obtained at a take-up reel. Namely, when the recording tape is wound on the hub, it can be wound so as to be offset toward either one end portion side from the widthwise direction substantially central portion of the hub. Therefore, positional fluctuations of the recording tape in the widthwise direction (axial direction) of the hub can be suppressed.

Accordingly, the traveling position of the recording tape can be stabilized, and tape edge damage, which occurs due to contact with the tape guides or the flanges of the take-up reel or the like provided in the drive device, can be prevented. Accordingly, even at high-density-recording drive devices, the occurrence of reading errors of servo signals and recording/playback errors of data signals can be reduced, and a reduction in position error signals and off-track can be expected.

Further, in the above-described aspect, a widthwise direction central portion of the large diameter portion may be offset, from the widthwise direction central portion of the hub, toward either one flange side by 5% to 40% of a width of the hub.

In accordance with the above-described aspect, effects which are substantially the same as the effects of the tape reel of the first aspect of the present invention can be obtained at a take-up reel. Namely, offsetting the recording tape toward either one end portion side from the widthwise direction substantially central portion of the hub when the recording tape is made to travel by the drive device, can be accomplished well. Namely, if the aforementioned offset amount is less than 5%, the recording tape cannot be offset well toward one end portion side, and if the offset amount is greater than 40%, the recording tape is excessively offset toward one end portion side. Note that the offset amount is preferably 8% to 24% of the width of the hub. In this range, good effects can be achieved even if the curving of the recording tape is large to a certain extent.

In the above-described aspect, radii of one end portion side and another end portion side of the hub may be different, and an end portion side whose radius is small may be a side toward which the large diameter portion is offset.

Further, in the above-described aspect, the recording tape may be wound around the hub such that a side of the recording tape where a radius of curvature of curving of a tape edge is small is at the side toward which the large diameter portion is offset.

In accordance with the above-described respective aspects, effects which are substantially the same as the effects of the tape reel of the first aspect of the present invention can be obtained at a take-up reel. Namely, even if the recording tape is curved, it is possible to suppress the phenomenon of the recording tape being wound while fluctuating in the widthwise direction of the hub. Accordingly, a proper and stable traveling position of the recording tape, and a state in which the amount of disorder in winding is small, can be realized.

In the above-described aspect, a clearance, which is calculated by subtracting a width of the recording tape from an interval between upper and lower flanges at an outer peripheral surface of the hub, may be 0.10 mm to 0.18 mm.

According to the above aspect, in a take-up reel, the effect obtained for the tape reel of the first aspect of the invention can be achieved. Namely, when the hub and the flange are integrally molded, the interval between the flanges can be narrowed well by deformation of the hub resulting from the tight-winding of the recording tape. Consequently, a state in which the amount of disorder in winding is small can be realized, and the traveling position of the recording tape can be stabilized at the appropriate position.

By "integrally" here means a configuration where deformation of the hub and deformation of the flanges are linked to/affect each other. That is, this means a configuration where the flanges deform in accompaniment with deformation of the hub or where the hub deforms in accompaniment with deformation of the flanges. Specific examples include an instance where the hub and the flanges are integrally molded and an instance where the flanges are welded to the hub.

In the above-described aspect, a ratio of a difference between a larger radius among radii of both end portions of the hub, and a radius of the large diameter portion, with respect to a width of the recording tape which is wound may be less than or equal to 0.0063.

In accordance with the above-described aspect, effects which are substantially the same as the effects of the tape reel of the first aspect of the present invention can be obtained at a take-up reel. Namely, in cases in which the hub and the flanges are formed integrally, even if the difference between the larger of the radii of the both end portions of the hub, and the radius of the large diameter portion, is slight, the interval between the pair of flanges is narrowed as the hub deforms due to tight-winding of the recording tape. Therefore, a state in which the amount of disorder in winding is small can be realized. Accordingly, the occurrence of tape edge damage can be prevented.

Note that the width of the recording tape is the mean value of a tolerance width and a standard value relating to the tape width of the recording tape at the drive device in which that recording tape is used. Further, the ratio of the difference between the larger radius of the both end portions of the hub and the radius of the large diameter portion, with respect to the width of the recording tape which is wound, is preferably less than or equal to 0.0053.

In the above-described aspect, a width of the recording tape which is wound may be substantially 12.65 mm, and a difference between a larger radius among radii of both end portions of the hub, and a radius of the large diameter portion, may be less than or equal to 0.08 mm.

In accordance with the above-described aspect, effects which are substantially the same as the effects of the tape reel of the first aspect of the present invention can be obtained at a take-up reel. Namely, in cases in which the hub and the flanges are formed integrally, even if the difference between the larger of the radii of the both end portions of the hub, and the radius of the large diameter portion, is slight, the interval between the pair of flanges is narrowed as the hub deforms due to tight-winding of the recording tape. Therefore, a state in which the amount of disorder in winding is small can be realized. Accordingly, the occurrence of tape edge damage can be prevented.

Note that the difference between the larger of the radii of the both end portions of the hub, and the radius of the large diameter portion, is preferably less than or equal to 0.067 mm. If this difference is larger than 0.08 mm, damage may arise at the tape edges. In the range of greater than 0.067 mm to less than or equal to 0.08 mm, there may be the possibility of being affected by the thickness of the recording tape and the rigidity of the hub. In order to reliably ensure the quality of the tape edges, it is preferable that the difference is less than or equal to 0.067 mm.

A pull-out member of a fourth aspect of the present invention pulls-out a recording tape from a recording tape cartridge, and is accommodated at the hub of the take-up reel of the third aspect of the present invention, and has a take-up surface which structures a portion of an outer peripheral surface of the hub. The take-up surface has a large diameter portion, whose axial direction is the same as the axial direction of the hub and whose diameter is larger than diameters of both axial direction end portion sides. The large diameter portion is offset, from a widthwise direction central portion of the take-up surface, toward one end portion side or another end portion side.

In accordance with the above-described aspect, the take-up surface of the pull-out member, which structures a portion of the outer peripheral surface of the hub of the take-up reel, has the large diameter portion whose diameter is larger than the diameters of the both end portions. The large diameter portion is offset, from the widthwise direction central portion of the take-up surface, toward one end portion side or the other end portion side. Therefore, effects which are substantially the same as the effects of the tape reel of the first aspect and the take-up reel of the third aspect of the present invention can be obtained.

A drive device of a fifth aspect of the present invention has the take-up reel of the third aspect of the present invention.

In accordance with the above-described aspect, effects which are substantially the same as the effects of the take-up reel of the third aspect of the present invention can be obtained at a drive device.

In the above-described aspect, the drive device may have the pull-out member of the fourth aspect of the present invention.

In accordance with the above-described aspect, effects which are substantially the same as the effects of the pull-out member of the fourth aspect of the present invention can be obtained at a drive device.

As described above, in accordance with the present invention, there can be provided a tape reel, a recording tape cartridge, a take-up reel, and a drive device at which, when a recording tape is wound on a hub, fluctuations in the axial direction of the hub can be suppressed and the occurrence of tape edge damage can be prevented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A tape reel comprising:
a hub on which a recording tape is wound; and
flanges provided at both end portions of the hub,
wherein the hub has a single large diameter portion whose diameter is larger than diameters of both widthwise direction (axial direction) end portion sides, diameters are decreased monotonously from the single large diameter portion toward the both widthwise direction respectively and the large diameter portion is offset, from a widthwise direction central portion of the hub, toward one flange side or another flange side,
wherein radii of said both end portions of the hub are different from each other, a width of the recording tape is substantially 12.65 mm, and a difference between a larger radius among said radii of said both end portions of the hub and a radius of the large diameter portion is greater than or equal to 0.067 mm and less than or equal to 0.08 mm.

2. The tape reel of claim 1, wherein a widthwise direction central portion of the large diameter portion is offset, from the widthwise direction central portion of the hub, toward either one flange side by 5% to 40% of a width of the hub.

3. The tape reel of claim 1, wherein radii of one end portion side and another end portion side of the hub are different, and an end portion side whose radius is small is a side toward which the large diameter portion is offset.

4. The tape reel of claim 1, wherein the recording tape is wound around the hub such that a side of the recording tape where a radius of curvature of curving of a tape edge is small is at the side toward which the large diameter portion is offset.

5. The tape reel of claim 1, wherein a clearance, which is calculated by subtracting a width of the recording tape from an interval between upper and lower flanges at an outer peripheral surface of the hub, is 0.10 mm to 0.18 mm.

6. The tape reel of claim 1, wherein a ratio of a difference between a larger radius among radii of both end portions of the hub, and a radius of the large diameter portion, with respect to a width of the recording tape is less than or equal to 0.0063.

7. A recording tape cartridge comprising:
the tape reel of claim 1; and
a case accommodating the tape reel rotatably.

8. The recording tape cartridge of claim 7, wherein the tape cartridge has single tape reel configuration.

9. The recording tape cartridge of claim 7, wherein the recording tape has servo signals that are a reference for positioning of a recording/playback head at a drive device, and a tape edge of the recording tape wound on the hub, which tape edge is at a side toward which the large diameter portion of the hub is offset, is a reference for servo tracking control when the recording tape travels.

10. The tape reel of claim 1, wherein the end portions of the hub are located at a position where the hub meets the one flange side or the other flange side.

11. A take-up reel provided within a drive device and on which is wound a recording tape pulled-out from a recording tape cartridge, the take-up reel comprising:
a hub on which the recording tape is wound; and
flanges provided at both end portions of the hub,
wherein the hub has a single large diameter portion whose diameter is larger than diameters of both widthwise direction (axial direction) end portion sides, diameters are decreased monotonously from the single large diameter portion toward the both widthwise direction respectively and the large diameter portion is offset, from a widthwise direction central portion of the hub, toward one flange side or another flange side,
wherein radii of said both end portions of the hub are different from each other, a width of the recording tape is substantially 12.65 mm, and a difference between a larger radius among said radii of said both end portions of the hub and a radius of the large diameter portion is greater than or equal to 0.067 mm and less than or equal to 0.08 mm.

12. The take-up reel of claim 11, wherein a widthwise direction central portion of the large diameter portion is offset, from the widthwise direction central portion of the hub, toward either one flange side by 5% to 40% of a width of the hub.

13. The take-up reel of claim 11, wherein radii of one end portion side and another end portion side of the hub are different, and an end portion side whose radius is small is a side toward which the large diameter portion is offset.

14. The take-up reel of claim 11, wherein the recording tape is wound around the hub such that a side of the recording tape where a radius of curvature of curving of a tape edge is small is at the side toward which the large diameter portion is offset.

15. The take-up reel of claim 11, wherein a clearance, which is calculated by subtracting a width of the recording tape from an interval between upper and lower flanges at an outer peripheral surface of the hub, is 0.10 mm to 0.18 mm.

16. The take-up reel of claim 11, wherein a ratio of a difference between a larger radius among radii of both end portions of the hub, and a radius of the large diameter portion, with respect to a width of the recording tape which is wound is less than or equal to 0.0063.

17. The take-up reel of claim 11, wherein a width of the recording tape which is wound is substantially 12.65 mm, and a difference between a larger radius among radii of both end portions of the hub, and a radius of the large diameter portion, is less than or equal to 0.08 mm.

18. A pull-out member that pulls-out a recording tape from a recording tape cartridge, and is accommodated at the hub of the take-up reel of claim 11, and has a take-up surface which structures a portion of an outer peripheral surface of the hub,
wherein the take-up surface has a large diameter portion, whose axial direction is the same as an axial direction of the hub and whose diameter is larger than diameters of both axial direction end portion sides, and the large diameter portion is offset, from a widthwise direction central portion of the take-up surface, toward one end portion side or another end portion side of the pull-out member.

19. A drive device comprising the take-up reel of claim 11 on which is wound a recording tape which is pulled-out from a recording tape cartridge loaded in the drive device.

20. A drive device comprising:
a take-up reel on which is wound recording tape which is pulled out from a recording tape cartridge loaded in the drive device, the take-up reel comprising:
a hub on which the recording tape is wound; and
flanges provided at both end portions of the hub,
wherein the hub has a single large diameter portion whose diameter is larger than diameters of both widthwise direction (axial direction) end portion sides, diameters are decreased monotonously from the single large diameter portion toward the both widthwise direction respectively and the large diameter portion is offset, from a widthwise direction central portion of the hub, toward one flange side or another flange side,
wherein radii of said both end portions of the hub are different from each other, a width of the recording tape is substantially 12.65 mm, and a difference between a larger radius among said radii of said both end portions of the hub and a radius of the large diameter portion is greater than or equal to 0.067 mm and less than or equal to 0.08 mm; and
a pull-out member that pulls-out a recording tape from a recording tape cartridge, and is accommodated at the hub of the take-up reel, and has a take-up surface which structures a portion of an outer peripheral surface of the hub,
wherein the take-up surface has a large diameter portion, whose axial direction is the same as an axial direction of the hub and whose diameter is larger than diameters of both axial direction end portion sides, and the large diameter portion is offset, from a widthwise direction central portion of the take-up surface, toward one end portion side or another end portion side of the pull-out member.

* * * * *